United States Patent
Uyehara

(10) Patent No.: US 6,252,526 B1
(45) Date of Patent: Jun. 26, 2001

(54) CIRCUIT AND METHOD FOR FAST PARALLEL DATA STROBE ENCODING

(75) Inventor: Clinton Uyehara, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/287,499

(22) Filed: Apr. 6, 1999

Related U.S. Application Data

(60) Provisional application No. 60/112,320, filed on Dec. 14, 1998.

(51) Int. Cl.[7] .................................................. H03M 7/00
(52) U.S. Cl. ................................ 341/50; 341/67; 341/70
(58) Field of Search .................................. 341/50, 70, 67

(56) References Cited

U.S. PATENT DOCUMENTS

| | | | |
|---|---|---|---|
| 4,075,622 | * | 2/1978 | Lawrence et al. ............. 341/67 |
| 5,163,067 | | 11/1992 | Wight et al. . |
| 5,412,697 | | 5/1995 | Van Brunt et al. . |
| 5,412,698 | | 5/1995 | Van Brunt et al. . |
| 5,483,656 | | 1/1996 | Oprescu et al. . |
| 5,559,967 | | 9/1996 | Oprescu et al. . |
| 5,596,724 | | 1/1997 | Mullins et al. . |
| 5,619,541 | | 4/1997 | Van Brunt et al. . |
| 5,621,739 | | 4/1997 | Sine et al. . |
| 5,692,021 | | 11/1997 | Walker . |
| 5,764,965 | | 6/1998 | Poimboeuf et al. . |
| 5,796,739 | | 8/1998 | Kim et al. . |

* cited by examiner

*Primary Examiner*—Michael Tokar
*Assistant Examiner*—Jean Bruner Jeanglaude

(57) ABSTRACT

A circuit for switching digital signals on a plurality of signal lines where signals on different signals line may have different signal rates includes a controller that prevents a switch from being turned off until after another switch is stably turned ON. This allows more than one switch at a time to supply a correspondingly received digital signal to an output. Substantially identical digital signals may be supplied to two inputs of such a circuit while the circuit is switched between the respective inputs. The circuit may be driven by an encoder that supplies encoded signals without recursion but that conforms to encoding conventionally supplied by recursion. The encoder may be implemented in parallel configuration for rapid encoding of a signal, and may be implanted to perform a data strobe signal encoding conforming to IEEE standard 1394.

53 Claims, 8 Drawing Sheets

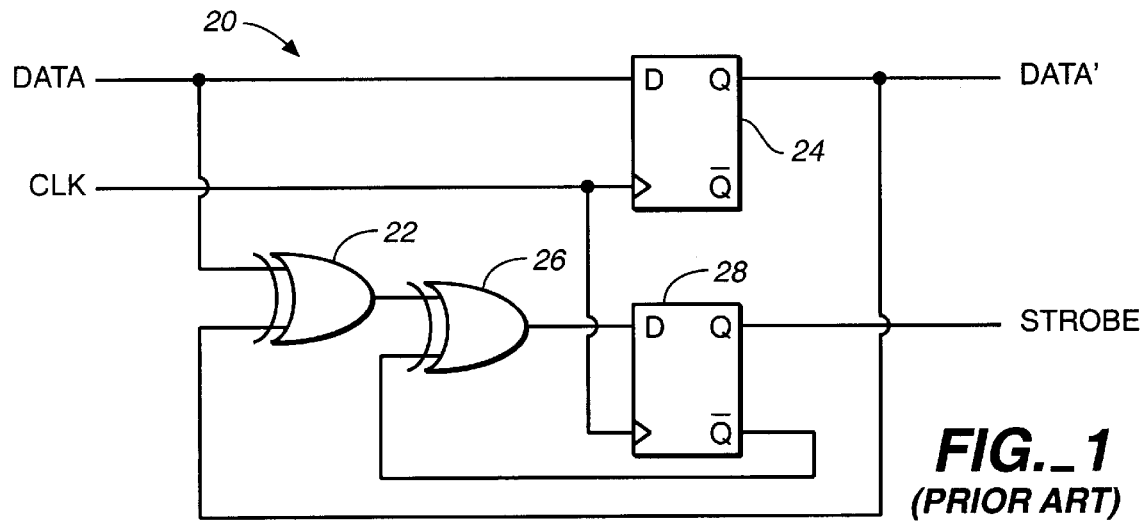
FIG._1
(PRIOR ART)
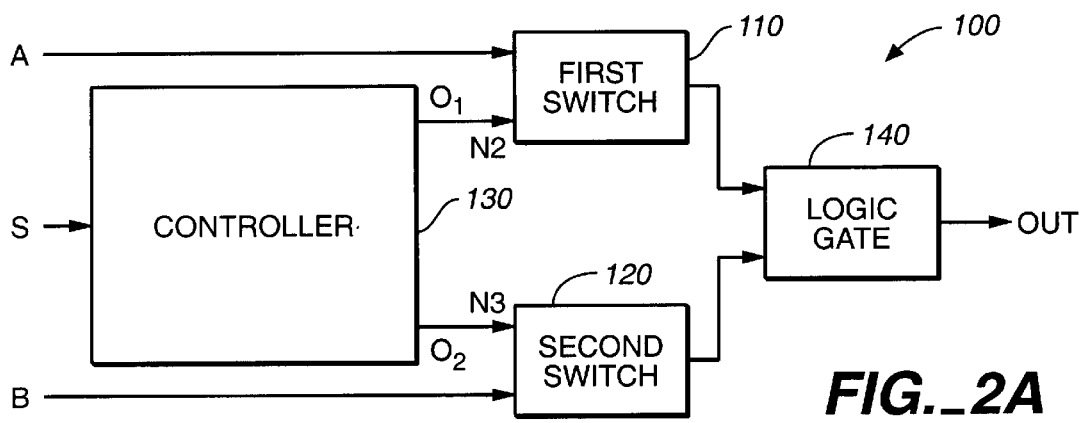
FIG._2A
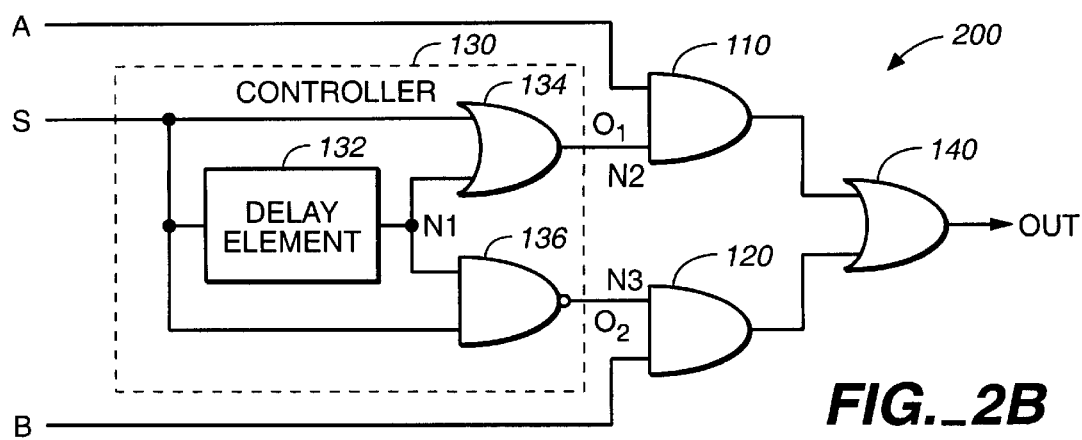
FIG._2B

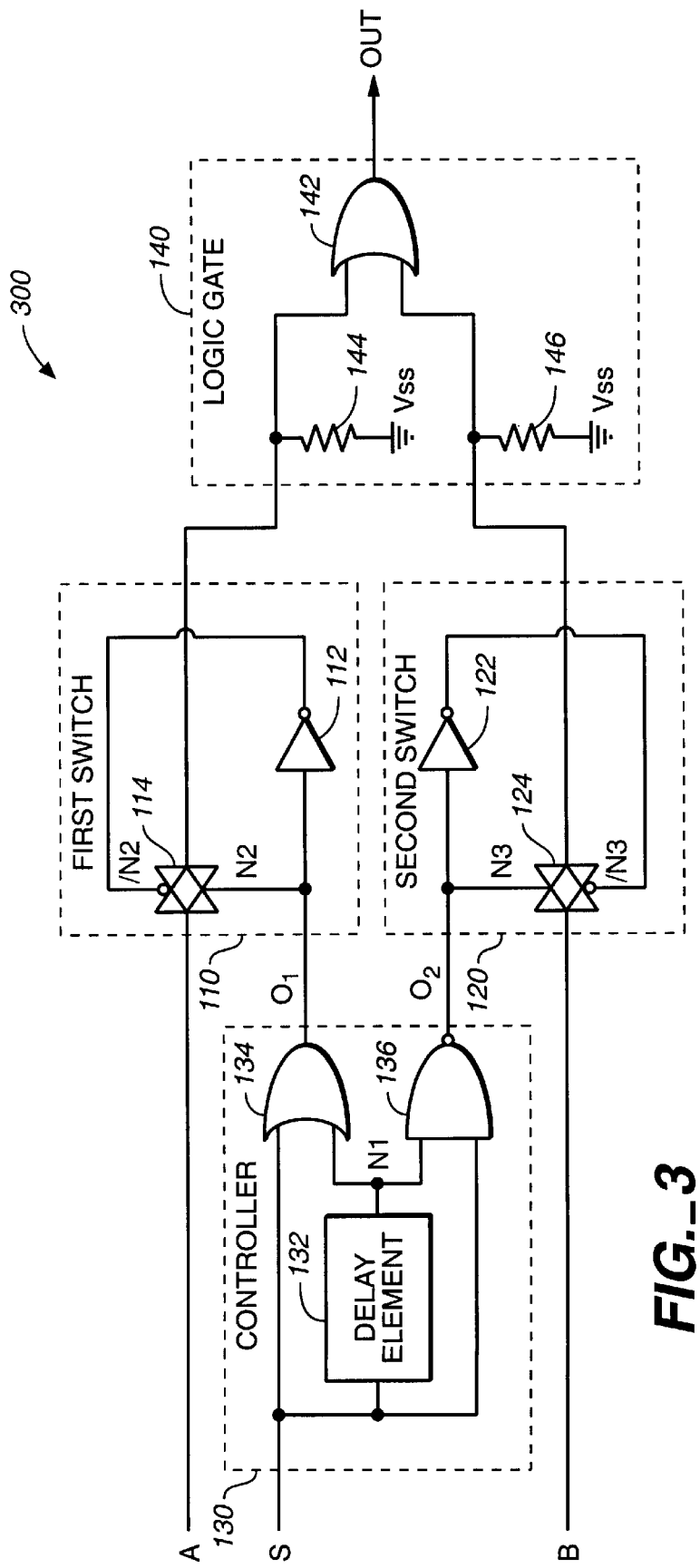
FIG._3

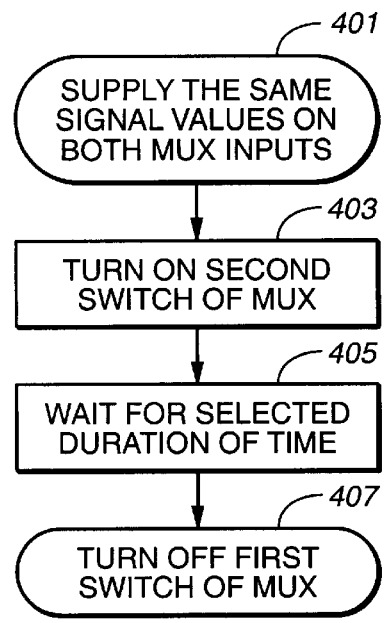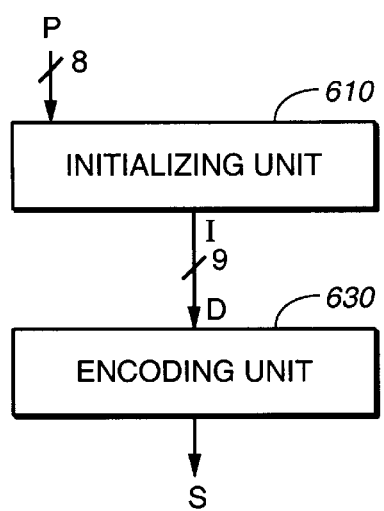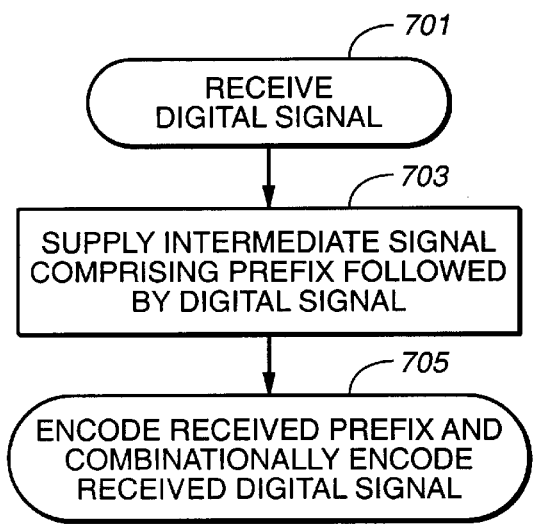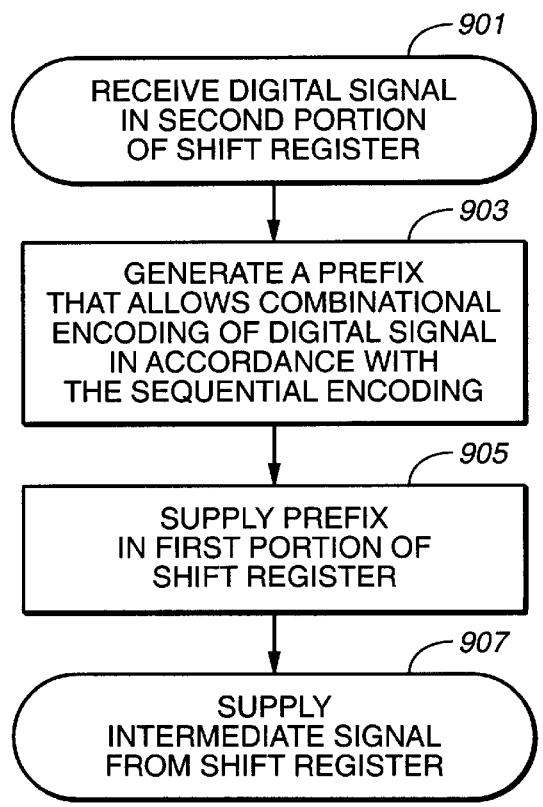

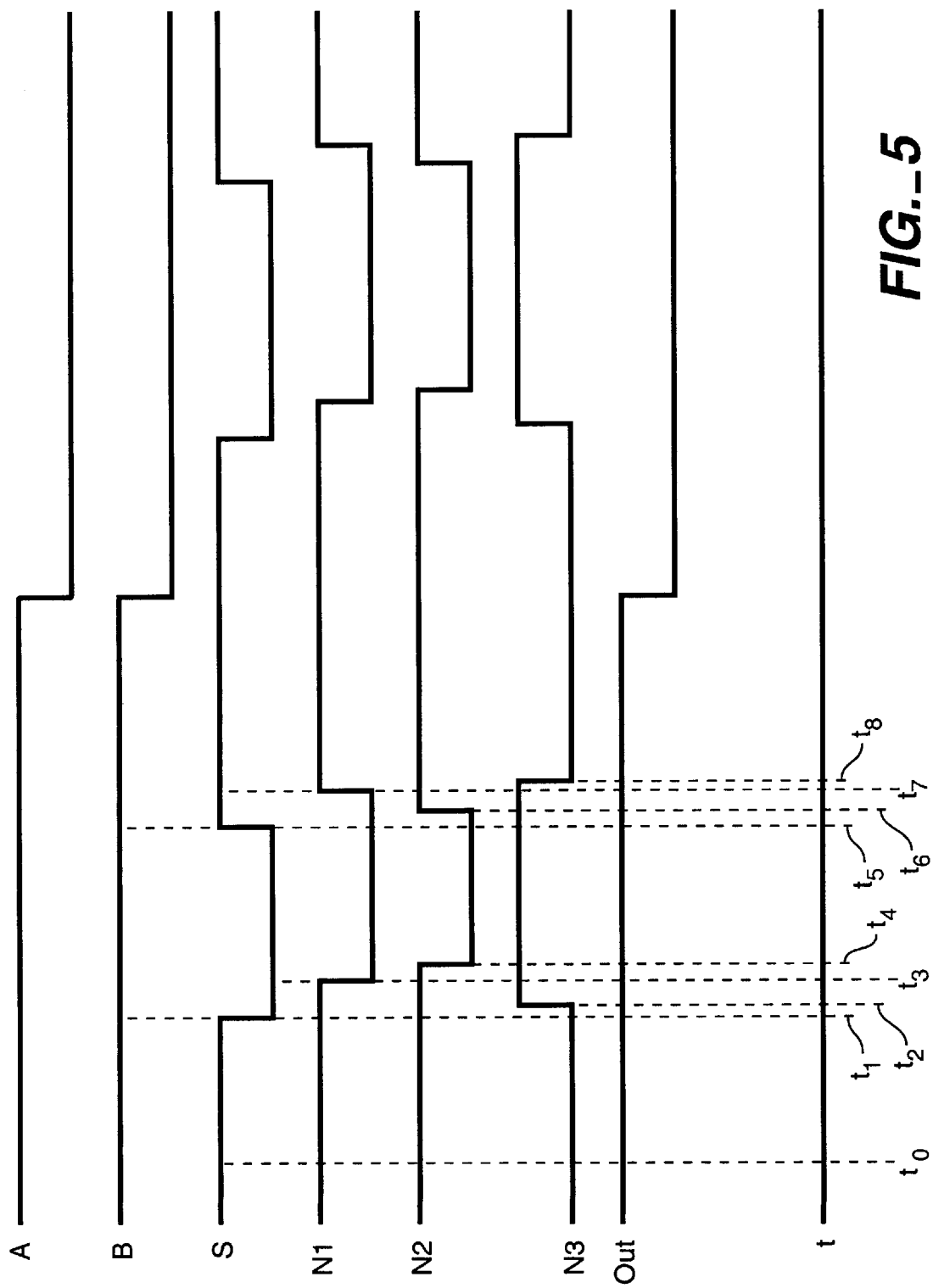
FIG._5

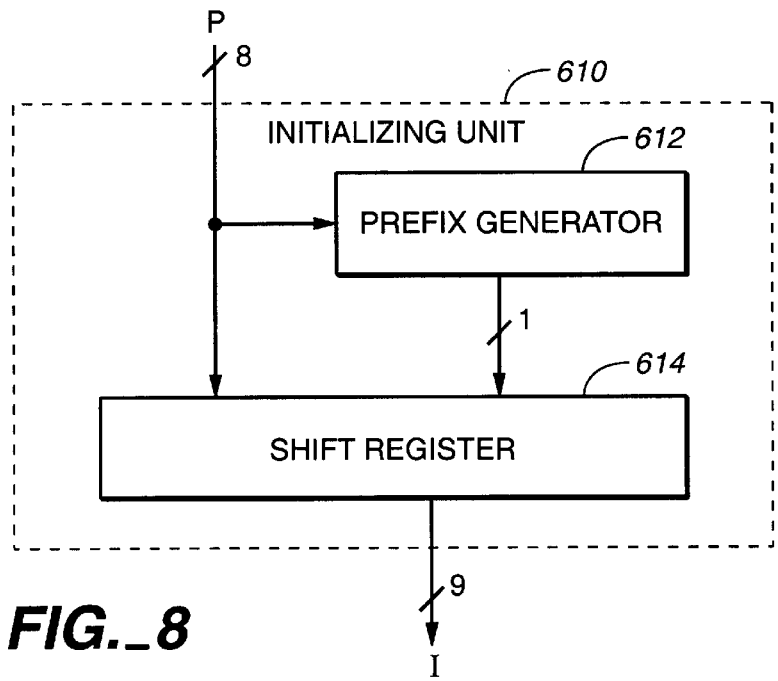
FIG._8
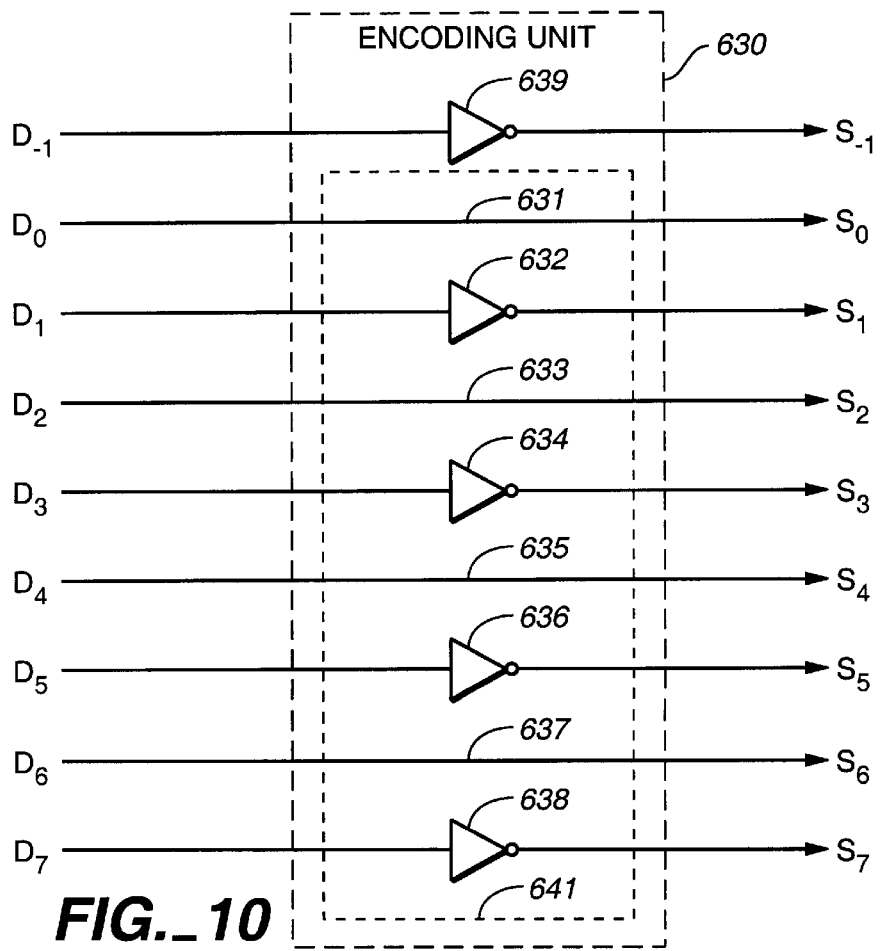
FIG._10

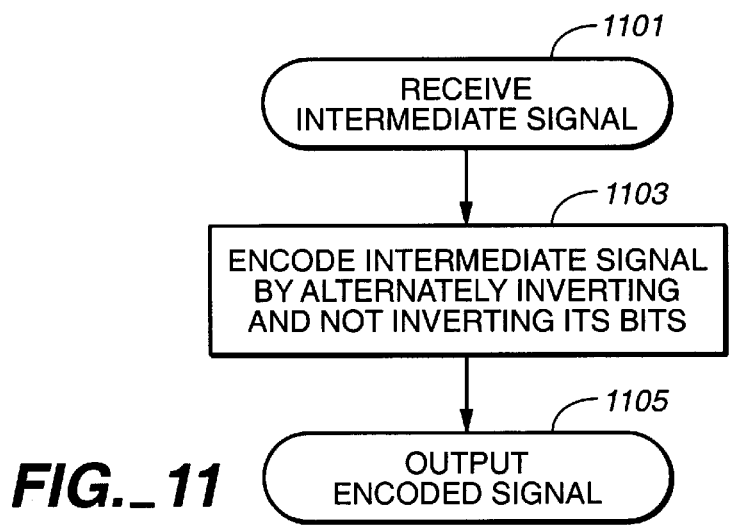
FIG._11
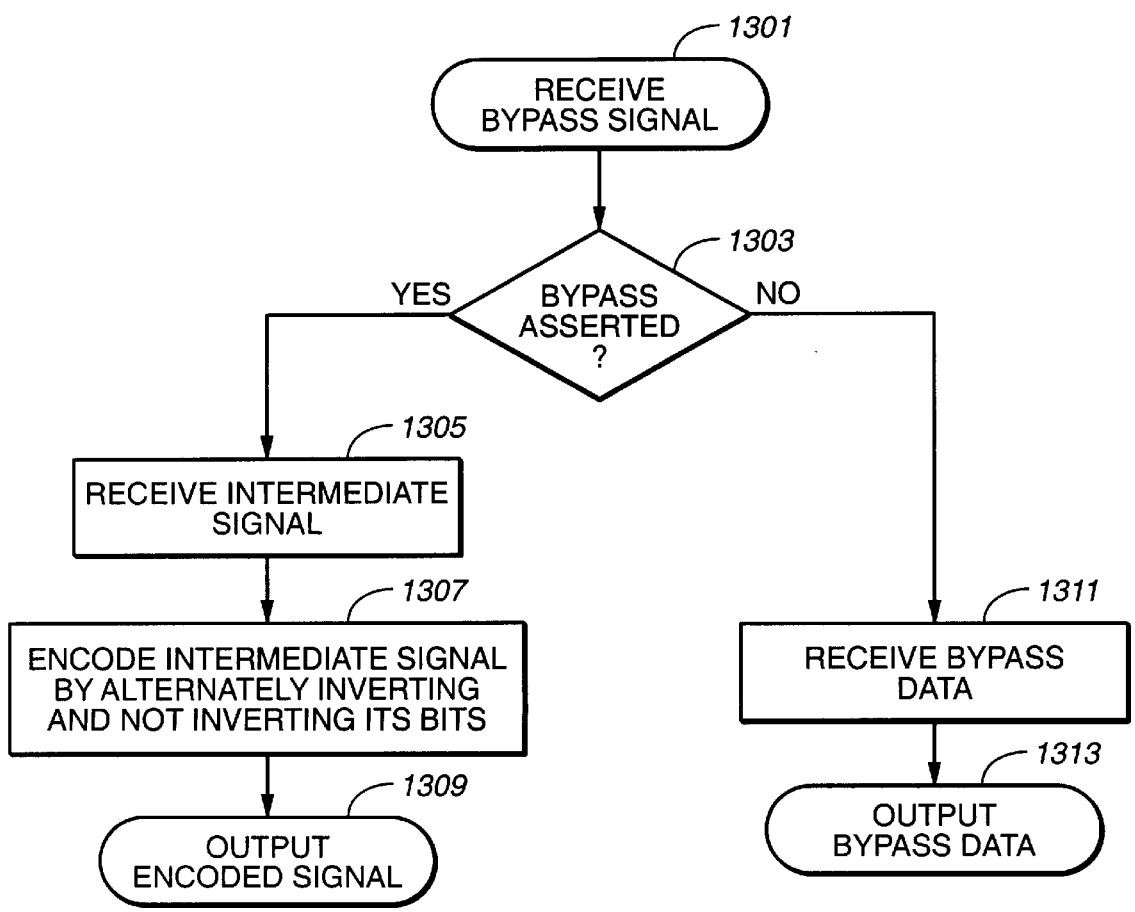
FIG._13

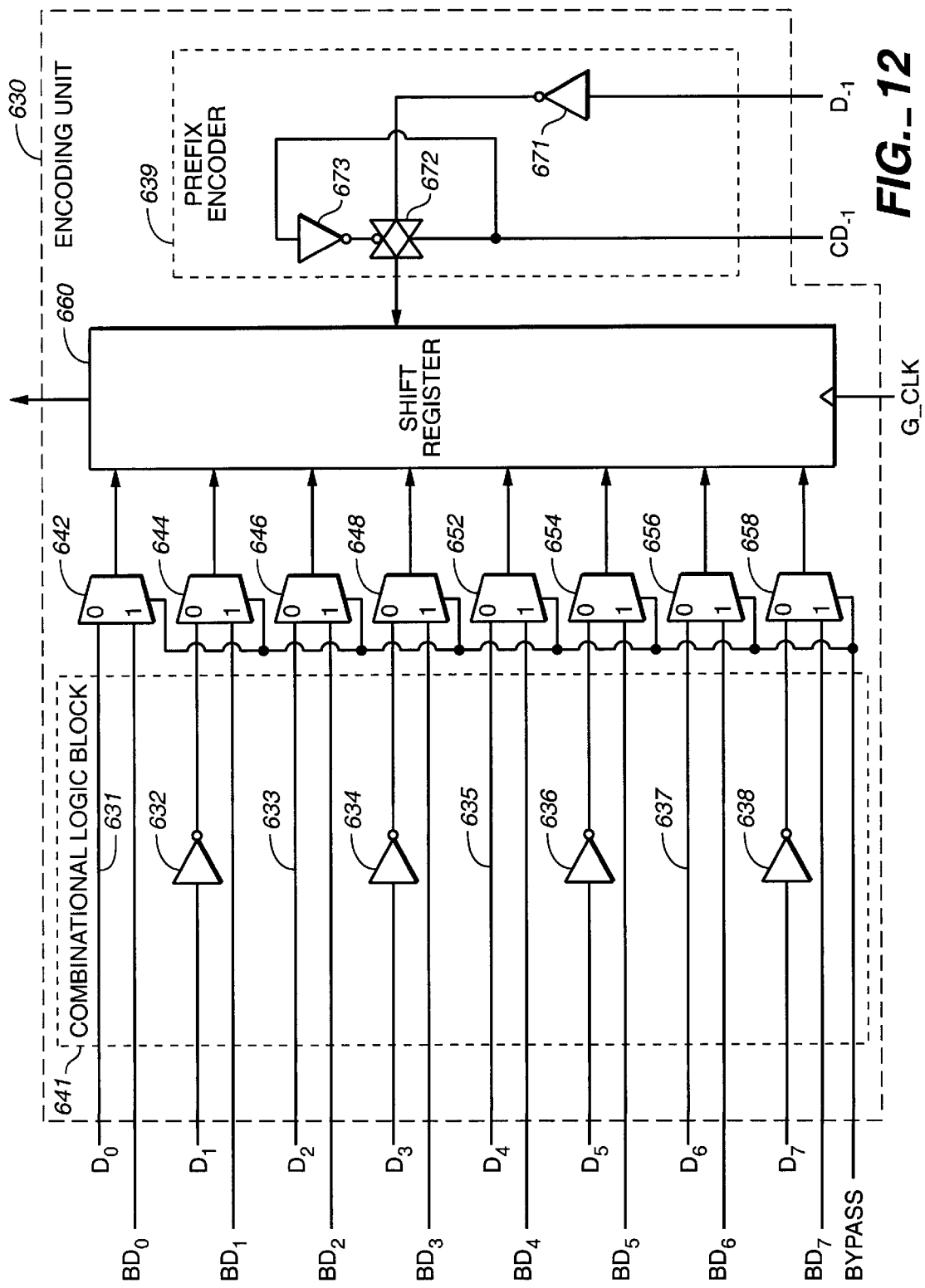
FIG._12

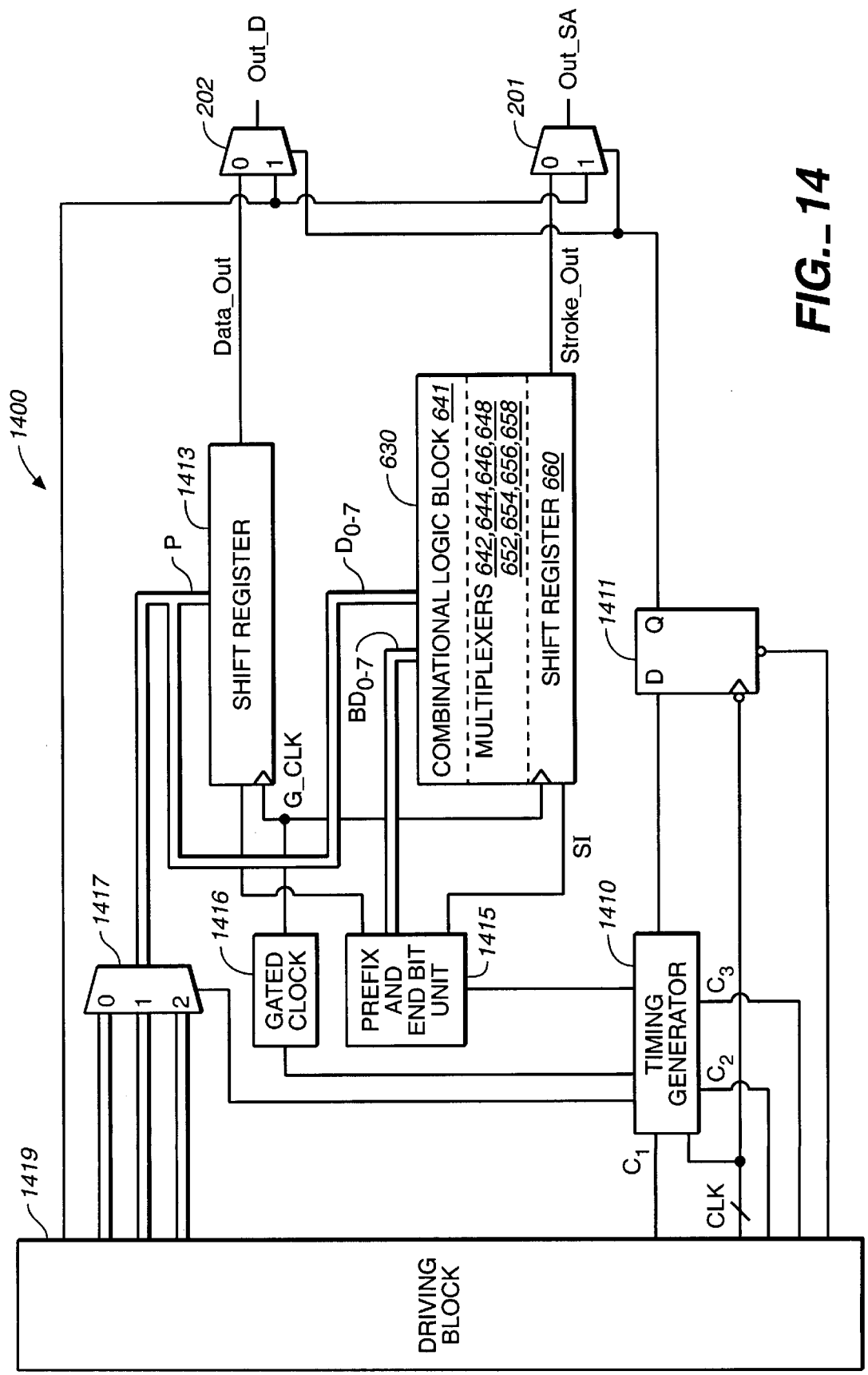
FIG._14

CIRCUIT AND METHOD FOR FAST PARALLEL DATA STROBE ENCODING

CROSS-REFERENCE TO RELATED APPLICATIONS

This application claims priority benefits of copending U.S. provisional application Ser. No. 60/112,320 filed Dec. 14, 1998, and is related to copending U.S. provisional application Ser. No. 60/112,322 entitled "Circuit and Method for Switching Between Digital Signals that have Different Signal Rates" filed Dec. 14, 1998.

TECHNICAL FIELD

The present invention is related to a circuit and a method for generating and switching between digital signals having different signal rates. More particularly, the present invention is related to encoding digital signals that have high signal rates to generate encoded signals, and further to switching such signals onto the same signal line with an arbitration signal having a low signal rate.

BACKGROUND ART

In modem electronics, it is common for an integrated circuit to generate a variety of signal types. An integrated circuit may, for example, generate data signals that convey information at a high signal rate, and may also generate arbitration signals that have a substantially lower signal rate and are useful for controlling other devices. Where signals having substantially different signal rates utilize the same signal path, various problems may arise due to the difference in signal rates. For example, a false or spurious signal commonly known as a glitch may occur in an output signal on the signal path due to the difference in signal rates.

One particularly important example occurs in computer systems having a bus that interconnects various components in accordance with IEEE Standard 1394 of the *Institute of Electrical and Electronics Engineers*. In this context, signals that have a high signal rate may include a data signal that conveys data in a signal rate range between about 100 MHz to 300 MHz, and may also include a strobe signal at substantially the same signal rate as the data signal that a receiving device may use to maintain synchronization with the data signal. The signals that have a low signal rate may include an arbitration signal having a signal rate of about 50 MHz. Such arbitration signals are specified in IEEE Standard 1394 for controlling operation of the bus and various devices connected to the bus.

One conventional approach for switching signals that have different signal rates onto the same signal path is to connect the signal sources of the signals to the signal path by means of a conventional multiplexor. If the maximum difference in signal rates between the signal sources exceeds about 100 MHz, this conventional approach does not operate properly. The difference in signal rates typically causes the multiplexor to generate a glitch at output. The glitch may be interpreted as being part of a data signal, and consequently may generate data errors. A glitch occurring when the multiplexor switches an arbitration signal onto the bus may be interpreted as being part of the arbitration signal, and could cause a receiving device to malfunction. Glitches occur at or near the beginning of a switched signal, and thus may interfere with signal prefixes, such as various signal prefixes required by IEEE Standard 1394 to indicate transition between signal types.

A further problem in this field is a one-cycle delay introduced to data and strobe signals by a conventional non-memoryless encoding circuit and method described in IEEE Standard 1394 for generating strobe signals. More particularly, IEEE Standard 1394 describes a conventional encoder for encoding data signals by means of recursion to generate strobe signals. This conventional encoder supplies the data signal to one input of a first XOR gate, and to the D input of a first D flip-flop. A delayed data signal supplied by the Q output of the first D flip-flop is fed back to the other input of the first XOR gate, and the output of the first XOR gate drives the first input of a second XOR gate. The output of the second XOR gate drives the D input of a second D flip-flop. The Q output of the second D flip-flop supplies the strobe signal. The /Q output supplies an inverted strobe signal that is fed back to the second input of the second XOR gate. Both D flip-flops are clocked by the same clock signal.

Clearly, this encoding is recursive due to operation of the D flip-flops. The encoding requires feedback from two sources. Moreover, the data signal must be delayed by at least one clock cycle to generate the strobe signal, and the data signal supplied to the bus will actually be a delayed data signal that is essentially a copy of the original data signal delayed by at least one full clock cycle. This added latency slows down the transmission of data to other devices that are connected to the bus, and thus is highly undesirable. There is thus a continuing need in the electronics arts for an improved circuit and an improved method for connecting a signal path to signal sources that supply signals at substantially different signal rates. Such a circuit and method preferably prevents output glitches from arising during switching operations. It is highly desirable for such circuit and method to be implemented in conformance with IEEE Standard 1394, and to support data and strobe signal rates that may exceed 200 MHz. An improved switching circuit is needed to drive the output buffers on an integrated circuit (IC) chip. Such an improved circuit preferably requires minimal space on the IC chip to implement.

There is also a need for an improved encoder and encoding method for encoding digital signals in parallel. Preferably such encoder and encoding method can be implemented to generate strobe signals in accordance with IEEE Standard 1394. To minimize latency of data and strobe signals, it is highly desirably to generate such strobe signals without use of recursion. Further it is highly desirable for at least one embodiment of the encoder to supply strobe signals according to IEEE Standard 1394 without introducing latency penalties.

DISCLOSURE OF INVENTION

An improved circuit and an improved method are disclosed that support encoding of digital signals by means of non-recursive logic. The improved circuit can be implemented using a minimal amount of space on an integrated circuit (IC) chip, and beneficially supports by non-recursive means signal encodings that conventionally require recursive logic or steps to implement. The improved circuit does not require a large number of transistors or other component elements to fabricate, and can conveniently be implemented with standard inverters.

In accordance with one aspect of the invention, a method for encoding bits of a digital signal in accordance with a recursive encoding algorithm comprises receiving the digital signal, supplying a prefix to the digital signal to generate an intermediate signal, and encoding the intermediate signal combinationally to generate an encoded signal that includes an encoding of the bits of the digital signal in accordance with the recursive encoding algorithm.

An embodiment of such method particularly beneficial for encoding data signals in conformance with IEEE Standard 1394 includes receiving a data packet that includes a sequence of bits that conforms to IEEE Standard 1394 requirements for data packets, placing a single bit of binary value 1 in front of a beginning of the data packet to generate a prefixed data packet, supplying a second bit of binary value 1, supplying the digital signal to an input of a combinational logic block, receiving an output signal responsive to the digital signal from an output of the combinational logic block, and concatenating the output signal after the second bit of binary value 1 to generate the encoded signal as a strobe signal conforming to IEEE Standard 1394.

In accordance with another aspect of the invention, an encoder for encoding a data signal to generate a strobe signal conforming to IEEE Standard 1394 includes a plurality of signal paths, each signal path having an input for receiving a respective bit of a data signal and having an output for supplying a corresponding bit of the strobe signal, with some of the single paths including an inverter.

In accordance with another aspect of the invention, an encoder for encoding a digital signal in accordance with a non-memoryless encoding algorithm to supply an encoded signal includes a first means for supplying a prefix to the digital signal, a second means for encoding the prefix of to supply a first portion of the encoded signal, and a third means for applying a memoryless encoding algorithm to a second portion of the digital signal to supply a second portion of the encoded signal.

In accordance with another aspect of the invention, an encoder for encoding bits of a digital signal in accordance with a recursive encoding algorithm includes an initializing unit for supplying a prefix to the digital signal to generate an intermediate signal, and a combinational logic block having an input coupled to receive the intermediate signal and having an output for supplying an encoded signal that includes an encoding of the bits of the digital signal in conformance with the recursive encoding algorithm.

The various features of various preferred and alternative embodiments of the improved circuit and method for encoding digital signals may be better understood by referring to the following discussion and the accompanying drawings in which like reference numerals refer to like elements in the text and the several figures. The contents of the following discussion and the figures are set forth as examples only and should not be understood to represent limitations upon the scope of the invention.

BRIEF DESCRIPTION OF DRAWINGS

FIG. 1 is a schematic diagram of a conventional encoder specified in IEEE Standard 1394 for encoding a data signal to generate a strobe signal.

FIG. 2A is a block diagram illustrating an embodiment of an improved multiplexor for switching signals that may have substantially different signal rates.

FIG. 2B is a block diagram illustrating an alternative embodiment of the improved multiplexor comprising a pair of switches fabricated from AND gates, a controller for controlling the switches that includes a delay element serially coupled to both an OR gate and a NAND gate, and a logic gate for combining signals output from the switches.

FIG. 3 is a block diagram illustrating another alternative embodiment of the improved multiplexor comprising a pair of switches fabricated from transmission gates, a controller for controlling the switches that includes a delay element serially coupled to both an OR gate and a NAND gate, and a logic gate for combining signals output from the switches that includes a OR gate and a pair of passive pull-downs.

FIG. 4 is a flow chart illustrating an embodiment of an improved method for switching a multiplexor that beneficially prevents glitches from occurring during switching operations.

FIG. 5 is a timing diagram illustrating the relative timing of various signals required for operation of the embodiment of improved multiplexor illustrated in FIG. 2B.

FIG. 6 is a block diagram illustrating an embodiment of an improved encoder for performing a recursive encoding algorithm by prefixing a received digital signal in an initializing unit to generate an intermediate signal, and encoding the intermediate signal combinationally in an encoding unit generate an encoded signal.

FIG. 7 is a flow chart illustrating an embodiment of an improved method for encoding a digital signal in accordance with a recursive encoding algorithm.

FIG. 8 is a block diagram illustrating an embodiment of an initializing unit suitable for inclusion in the improved encoder.

FIG. 9 is a flow chart illustrating a method of operating the initializing unit illustrated in FIG. 8.

FIG. 10 is a schematic diagram illustrating an embodiment of an improved encoding unit that includes a prefix encoder and a combinational logic block for performing various encoding operations in parallel, and that is suitable for inclusion in various embodiments of the improved encoder.

FIG. 11 is a flow chart illustrating a method of operating the encoding unit illustrated in FIG. 10.

FIG. 12 is a schematic diagram illustrating an embodiment of an improved encoding unit that supplies an encoding of a digital signal in parallel to a shift register that supplies the encoding of the digital signal and an alternative signal serially to another device.

FIG. 13 is a flow chart illustrating an embodiment of the improved method of encoding digital signals that can be performed by the encoding unit illustrated in FIG. 12.

FIG. 14 is a block diagram illustrating an alternative embodiment of the improved encoder that drives a first improved multiplexor interconnected with additional circuitry that supplies a data signal conforming to IEEE 1394 both to the improved encoder and to a second improved multiplexor, with both improved multiplexor being further driven by an arbitration signal source conforming to IEEE 1394.

MODES FOR CARRYING OUT THE INVENTION

Disclosed are various embodiments of a circuit and a method for encoding a digital signal. Bits of the digital signal are beneficially encoded in parallel to reduce latency of encoding operations. Also disclosed are various embodiments of a circuit and a method for switching a signal that has a high signal rate onto the same signal path with another signal that has a low signal rate without producing a glitch on the signal path. Glitches are prevented even where the various signals have signal rates that differ by 50 MHz or more. The various circuits and methods are highly beneficial for encoding data signals to generate strobe signals, and for supplying such signals to the same signal path with an arbitration signal, in conformance with IEEE Standard 1394 of the *Institute of Electrical and Electronics Engineers*. The entirety of IEEE Standard 1394 is incorporated herein by reference.

Referring now to FIG. 1, there is shown a schematic diagram of a conventional encoder 20 specified in IEEE Standard 1394 for encoding a data signal by means of recursion to generate a strobe signal. Conventional encoder 20 includes first and second XOR gates 22, 26 and first and second D flip-flops 24, 28. The D flip-flops 24, 28 are both clocked by a clock signal on line CLK. An input data signal ($d_0, d_1, d_2, \ldots, d_m$), where index m is an integer and each term $d_m$ represents a bit, is supplied in series along line DATA to a first input of the first XOR gate 22, and to the D input of the first D flip-flop 24. One bit of the input data signal is supplied per clock cycle. A delayed output data signal ($d'_0=d_0, d'_1=d_1, \ldots, d'_m=d_m$) is supplied on line DATA' by the Q output of the first D flip-flop 24. It is noted that each bit $d'_i$ of the delayed output data signal is generated one clock cycle after receipt of a corresponding bit $d_i$ of the input data signal. The delayed output data signal $d'_0, d'_1, \ldots, d'_m$ is fed back to a second input of the first XOR gate 22, and the output of the first XOR gate 22 drives a first input of the second XOR gate 26. The output of the second XOR gate 26 drives the D input of the second D flip-flop 28. The Q output of the second D flip-flop 28 supplies a strobe signal ($s_0, s_1, s_2, \ldots s_m$) along line STROBE. The /Q output of the second D flip-flop 28 supplies an inverted strobe signal that is fed back to a second input of the second XOR gate 26.

The encoding provided by encoder 20 may be expressed as follows:

$$s_0 = d_0, \quad \text{(Eq. 1)}$$

$$s_1 = (d_1 \oplus d_0) \oplus /s_0, \quad \text{(Eq. 2)}$$

$$s_2 = (d_2 \oplus d_1) \oplus /s_1, \quad \text{(Eq. 3)}$$

$$\ldots$$

$$s_m = (d_m \oplus d_{m-1}) \oplus /s_{m-1}, \quad \text{(Eq. 4)}$$

where index m is an integer. For example, to generate strobe bit $s_1$, data bit $d_1$ from the input D and data bit $d_0$ from the Q output of D flip-flop 24 are supplied to XOR gate 22 to generate bit ($d_1 \oplus d_0$) The generated bit ($d_1 \oplus d_0$) and an inverted strobe bit /$s_0$ are next supplied to the second XOR gate 26 to generate bit ($d_1 \oplus d_0$)⊕/$s_0$. The generated bit ($d_1 \oplus d_0$)⊕/$s_0$ is then supplied to the D input of the second D flip-flop 28. During the next clock cycle on clock line CLK, the generated bit ($d_1 \oplus d_0 \oplus /s_0$) is supplied at the Q output of the second D flip-flop 28 as strobe bit $s_1$. Each strobe bit $s_1$ is thus supplied on the same cycle as a corresponding bit $d'_i$ of the delayed output data signal.

The encoding provided by conventional encoder 20 is recursive due to the feedback from the D flip-flops 24, 28. Strobe bit $s_1$ for i>0 is dependent on the predecessor strobe bit $s_{i-1}$ and on the predecessor data bit $d_{i-1}$. The encoding is non-memoryless as at least one strobe bit is dependent on a predecessor data bit. The data signal $d_0, d_1, d_2, \ldots, d_m$ must be delayed by one clock cycle to generate the strobe signal $s_0, s_1, s_2, \ldots, s_m$. The delayed output data signal $d'_0, d'_1, \ldots, d'_m$ supplied to line DATA' by the Q output of the first D flip-flop 24 is essentially a copy of the input data signal $d_0, d_1, d_2, \ldots, d_m$ on line DATA delayed by a clock cycle. This delay slows down the transmission of data to other devices, and thus is highly undesirable. Further, the conventional encoder 20 cannot encode the bits of the data signal in parallel, but must rather encode each bit in series by means of several gates, and hence several gate delays. These problems restrict the speed of the encoding process applied by the conventional encoder 20.

It is also difficult to interconnect the conventional encoder 20 with other devices. For example, if the output line DATA' of conventional encoder 20 and a source of arbitration signals conforming to IEEE Standard 1394 are connected in a conventional manner to the same signal path, a glitch may be produced on the signal path due to a difference in their signal rates. There is thus a need for an improved circuit and method for encoding a data signal to generate a strobe signal, and for supplying such signals to the same signal path with an arbitration signal without generating a glitch on the signal path.

Referring now to FIG. 2A, there is shown a block diagram of an embodiment of an improved multiplexor 100 for switching signals that may have substantially different signal rates. Improved multiplexor 100 includes a first switch 110, a second switch 120, a controller 130, and a logic gate 140. Supply and ground voltages for the improved multiplexor 100 may be, for example, 3 volts and 0 volts respectively. In this embodiment of the improved multiplexor 100, HIGH states are asserted at or substantially at the supply voltage, and LOW states are asserted at or substantially at the ground voltage. This embodiment of the improved multiplexor 100 may be implemented in conformance with IEEE Standard 1394.

It is noted that the supply voltage, ground voltage, HIGH state, and LOW state may vary from specified values due, for example, to tolerances of system components. It is further noted that in alternative embodiments of the improved multiplexor, other values for supply and ground voltages may be used. For example, the supply voltage may alternatively be 5 volts, and the HIGH state may alternatively be asserted at 5 volts or 0 volts.

The components of the improved multiplexor 100 preferably have the following attributes. The first switch 110 has an input (A) for receiving a first digital signal, a control terminal (N2) for controlling the first switch 110, and an output. In this embodiment of the improved multiplexor 100, the first switch 110 is turned ON by asserting the HIGH state to its control terminal, and is turned OFF by asserting the LOW state to its control terminal. When the first switch is turned ON, input A of the first switch 110 is connected with the output, so that the first digital signal, or representation thereof, is supplied to the output. When the first switch 110 is turned OFF, the input A is essentially disconnected from the output. This can be achieved, for example, by asserting the LOW state from the output when the first switch 110 is turned OFF, or alternatively, by supplying a high impedance at the output of the switch 110 when it is turned OFF. Regardless of implementation, switching time is required for the first switch 110 to change state from being stably OFF to being stably ON, and vice versa. The second switch 120 similarly has an input (B) for receiving another digital signal, a control terminal (N3) for controlling the second switch 120, and an output. The second switch 120 preferably has the same design and attributes as the first switch 110, and preferably is controlled in a similar manner.

The controller 130 has an input (S) for receiving a control signal, a first output ($O_1$), and a second output ($O_2$). Each output $O_1$, $O_2$ supplies a respective intermediate signal asserted at states responsive to the states of the control signal. More particularly, when the control signal changes state from the LOW state to the HIGH state, the intermediate signal supplied by output $O_1$ responds by changing state from the LOW state to the HIGH state, preferably with a very short interval of time, for example, 1 nanosecond or less. The intermediate signal supplied by the other output $O_2$ remains in a HIGH state for an interval of time slightly longer than the switching time required to stably turn ON the first switch 110, and then changes state to the LOW state.

This interval of time is about 2 nanosecond in length in this embodiment of the improved multiplexor 100, however other intervals of time may alternately be used. When the control signal changes state from the HIGH state to the LOW state, the intermediate signal supplied by output $O_2$ responds by changing state from the LOW state to the HIGH state, preferably within a very short interval of time of, for example, 1 nanosecond or less. The intermediate signal supplied by the other output $O_1$ remains in a HIGH state for an interval of time slightly longer than the switching time required to stably turn ON the second switch 120. In this embodiment of the improved multiplexor 100, this interval of time is also about 2 nanoseconds, although other intervals of time may alternatively be used. When the control signal changes state, there is an interval of time when both intermediate signals are asserted at HIGH state. After this interval of time and until the control signal again changes state, one of the intermediate signals is asserted at LOW state and the other intermediate signal is asserted at HIGH state.

The logic gate 140 includes a first input, a second input, and an output. The output of the logic gate 140 supplies an output signal for the improved multiplexor 100. After the multiplexor has fully completed a switching operation and achieved a stable state, this output signal is responsive to a state asserted at one of the two inputs of the logic gate. However, during switching operations of the multiplexor 100, and prior to achieving stable state, the output signal of the logic gate 140, and hence the output signal of the multiplexor 100, is responsive to states asserted at each of the inputs of the logic gate 140.

The switches 110, 120, controller 130, and logic gate 140 are interconnected as follows. The first output $O_1$ of the controller is coupled to the control terminal N2 of the first switch 110, and the second output of the controller 130 is coupled to the control terminal N3 of the second switch 120. The inputs of the switches 110, 120 respectively receive the first and second digital signals from other circuitry (not shown) such as the core of an integrated circuit (IC) chip. The output of each switch 110, 120 is coupled to a respective one of the inputs of the logic gate 140. The output of the logic gate 140 comprises the output of the improved multiplexor 100.

This embodiment of the improved multiplexor 100 operates as follows. The first digital signal is supplied to input A of the first switch 110, the second digital signal is supplied to input B of the second switch 120, and the control signal is supplied to input S of the controller 130. In response to the control signal changing state from the LOW state to the HIGH state, the intermediate signal supplied by output $O_1$ of the controller 130 promptly changes state from the LOW state to the HIGH state. This asserts the HIGH state on control terminal N2, thereby turning ON the first switch 110. Consequently, the output of the first switch 110 supplies the first digital signal to the first input of the logic gate 140. Due to operation of the controller, the intermediate signal supplied by output $O_2$ of the controller 130 remains in the HIGH state for about 2 nanoseconds. During this interval of time, the HIGH state remains asserted on the control terminal N3 of the second switch 120. This leaves the second switch turned ON. Consequently, the output of the second switch supplies the second digital signal to the second input of the logic gate 140. The logic gate 140 combines the first and second digital signals in conformance with a Boolean logic operation to generate the output signal of the improved multiplexor 100. This functionality of the improved multiplexor 100 is highly beneficial for preventing glitches in the output signal. Once this interval of 2 nanoseconds expires, the intermediate signal supplied by output $O_2$ of the controller 130 changes state from the HIGH state to the LOW state. This asserts the LOW state on control terminal N3, thereby turning OFF the second switch 120. When the second switch is OFF, its output asserts the LOW state (or alternatively a high impedance), and the output signal from the logic gate 140 is determined by the state of the first digital signal received at the first input of the logic gate 140.

Operation of the improved multiplexor 100, when the control signal changes state from the HIGH state to the LOW state is similar to that described above. More particularly, in response to the control signal changing state to the LOW state, the intermediate signal supplied by output $O_2$ of the controller 130 promptly changes state from the LOW state to the HIGH state. This asserts the HIGH state on control terminal N3, thereby turning ON the second switch 120. Due to operation of the controller 130, the intermediate signal supplied by output $O_1$ of the controller 130 remains in the HIGH state for about 2 nanoseconds. During this interval of time, the HIGH state remains asserted on the control terminal N2 of the first switch 110. This leaves the first switch turned ON. Thus, during this interval of time, the logic gate 140 combines the first and second digital signals in conformance with a Boolean logic operation to generate the output signal of the improved multiplexor 100. This functionality of the improved multiplexor 100 is highly beneficial for preventing glitches in the output signal. Once this interval of about 2 nanoseconds expires, the intermediate signal supplied by output $O_1$ of the controller 130 changes state from the HIGH state to the LOW state. This asserts the LOW state on control terminal N2, thereby turning OFF the first switch 110. When the first switch is OFF, its output asserts the LOW state (or alternatively a high impedance), and the output signal from the logic gate 140 is determined by the state of the second digital signal as received at the second input of the logic gate 140.

Referring now to FIG. 2B, there is shown a block diagram of an alternative embodiment of the improved multiplexor 200 fabricated substantially from conventional logic gates. Improved multiplexor includes a first switch 110, a second switch 120, a controller 130, and a logic gate 140 that have the same inputs and outputs as in improved multiplexor 100, and that are interconnected in substantially the same manner as improved multiplexor 100. In this embodiment of the improved multiplexor 200, each switch 110, 120 comprises an AND gate, the logic gate 140 comprises an OR gate, and the controller 130 has the particular structure described below. Improved multiplexor 200 may be powered by a supply voltage of 3 volts, and have a ground voltage of 0 volts, with HIGH states being asserted at or substantially at the supply voltage, and LOW states being asserted at or substantially at the ground voltage. Other supply and ground voltage levels may alternatively be used. The supply voltage, ground voltage, HIGH state, and LOW state may vary from specified values as in improved multiplexor 100.

The first switch 110 is turned OFF by asserting the LOW state to control terminal N2. The LOW state causes the output of the first switch 110 to assert a LOW state regardless of the state asserted on the other input. The first switch is turned ON by asserting a HIGH state to control terminal N2. The HIGH state causes the output of the first switch 110 to assert the state asserted to its other input. The second switch 120 operates in like manner.

The logic gate 140 comprises an OR gate in this embodiment of the improved multiplexor 200. When exactly one of the switches is ON, one of the inputs of the OR gate receives the LOW signal asserted by the switch that is OFF, and the other input of the OR gate receives the digital signal supplied by the switch that is ON. The OR gate will thus supply this digital signal, or representation thereof, as the output signal of the improved multiplexor 200. However, when both of the switches 110, 120 are ON, the output signal supplied by the OR gate is the logical OR of the two digital signals received at inputs A and B of the multiplexor 200.

In this embodiment of the improved multiplexor 200, the controller 130 includes a delay element 132, an OR gate 134, and a NAND gate 136. The delay element 132 has an input S that receives the control signal, and has an output that supplies a copy of the control signal delayed by about 2 nanosecond as a delay signal. The input S of the delay element 132 is coupled to a first input of the OR gate 134 and to a first input of NAND gate 136, and the output of the delay element 132 is coupled to a second input of OR gate 134 and to a second input of NAND gate 136. Thus, when the control signal changes state from the LOW state to the HIGH state, the first input of the OR gate 134 receives this HIGH state, and the output of the OR gate 134 promptly asserts the HIGH state. However, for about 2 nanoseconds after the control signal changes to the HIGH state, the delay signal will continue to be asserted at LOW state. This LOW state is received by the second input of NAND gate 136, which causes the output of NAND gate 136 to assert a HIGH state. After about 2 nanoseconds, the control signal and the delay signal will both be asserted at HIGH state. This causes the output of the NAND gate 136 to assert the LOW state.

When the control signal changes state from the HIGH state to the LOW state, the first input of NAND gate 136 receives this LOW state, and the output of NAND gate 136 thus promptly asserts the HIGH state. However, for about 2 nanoseconds, the delay signal will be asserted at HIGH state. This HIGH state is received by the second input of OR gate 134, which causes the output of OR gate 134 to assert the HIGH state. After about 2 nanoseconds, both the control signal and the delay signal will both be asserted at LOW state. This causes the output of the OR gate 134 to assert a LOW state. This embodiment of the delay element 132 supplies substantially the same duration of delay regardless of the state of the control signal.

Referring now to FIG. 3 there is shown a block diagram of another alternative embodiment of the improved multiplexor 300. Improved multiplexor 300 comprises a first switch 110, a second switch 120, a controller 130, and a logic gate 140 that have the same inputs and outputs as in improved multiplexors 100, 200, and that are interconnected in substantially the same manner as improved multiplexors 100, 200. The controller 130 has the same design as in improved multiplexor 200. The other components of improved multiplexor 300 differ from the corresponding components of improved multiplexors 100, 200 as follows.

The first switch 110 of improved multiplexor 300 comprises a transmission gate 114 and an inverter 112. The transmission gate 114 includes input A, control terminals N2, /N2, and the output of the first switch 110. The inverter 112 is coupled in series between the control terminals N2 and /N2 of the transmission gate 114. The first transmission gate 110 is turned ON by asserting the HIGH state to control terminal N2, and is turned OFF by asserting the LOW state to control terminal N2. The second switch 120 has the same design as the first switch 110, and operates in the same manner as the first switch 110. More particularly, the second switch 120 comprises a transmission gate 124 and an inverter 122, with the inverter 122 being coupled in series between control terminals N3, /N3 of the transmission gate 124. The transmission gate 124 includes input B and the output of the second switch 120, is turned ON by asserting the HIGH state to control terminal N3, and is turned OFF by asserting the LOW state to control terminal N3.

The logic gate 140 comprises an OR gate 142 and two passive pull-downs 144, 146 each coupled at one end to a respective input of the OR gate 142 and at the other end to electrical ground (Vss). The OR gate 142 has a conventional design wherein binary value ONE is represented by the HIGH state and binary value ZERO is represented by the LOW state. The logic gate 140 also supplies a logical OR operation, but binary value ZERO can be asserted either supplying the LOW state or alternatively by asserting a high impedance condition to it inputs. For example, when high impedance is asserted to the first input of the logic gate 140, passive pull-down 144 draws the voltage at the input of OR gate 142 down substantially to the LOW state, thereby allowing the high impedance to represent binary value ZERO.

Operation of this embodiment of the improved multiplexor 300 is substantially identical to that of improved multiplexor 200 for ON states of the switches 110, 120. For example, when the first switch 110 is ON, it supplies the digital signal received at input A to the first input of the logic gate 142. This digital signal has HIGH and LOW states, and with the LOW state representing a zero. However, when the first switch 110 is turned OFF, its output asserts high impedance to the first input of the logic gate 140. Passive pull-down 144 then draws the voltage level at the first input of the OR gate 142 down substantially to the ground voltage Vss, thus asserting a LOW state or logical zero to this input of the OR gate 142. The second switch behaves similarly during OFF states.

Logic gate 140 may alternatively be omitted from improved multiplexor 300, for example, by coupling the output of the first switch 100 to the output of the second switch 120. The coupled outputs form an output for the modified multiplexor 300. If this modification is made to the multiplexor, then it is important to assure that both inputs A, B of the modified multiplexor 300 are supplied with the same signal voltage during switching operations to prevent signal contention at the output of the modified multiplexor 300. A substantial deviation in signal voltage at the inputs A, B during a switching operation of the modified multiplexor may yield an excessive flow of current between the inputs A, B as these inputs fight one another for control of the output of the modified multiplexor.

The improved multiplexors 100, 200, 300 are particularly beneficial when the first and second digital signals have substantially different signal rates. For example, the first digital signal may be a data signal having a high signal rate in conformance with IEEE Standard 1394, and the second digital signal may be an arbitration signal having a low signal rate in conformance with IEEE Standard 1394. In conventional multiplexors, such a difference in signal rates could cause a glitch to arise in an output signal, for example, because the output of multiplexor temporarily floats while the signal with the lower signal rate is set up for assertion.

Referring now to FIG. 4, there is shown a flow chart illustrating an embodiment of a method performed by means of improved multiplexor 200 to prevent such glitches. Referring now to FIG. 5 there is shown a timing diagram for the improved multiplexor 200 when operated in accordance with this method. The timing diagram illustrates signal values at various points A, B, S, N1, N2, N3, and Out with respect to time t. At time to, the first digital signal is supplied to input A at the same state 401 as an initial state of the second digital signal supplied at input B. This initial state is the HIGH state in the illustration, but could alternatively be the LOW state. To prevent glitches, neither digital signal should be asserted at an intermediate state or value substantially different than the HIGH or LOW state during a switching operation of the multiplexor 200.

At time $t_1$, the control signal supplied to control terminal S changes state from the HIGH state to the LOW state. Immediately thereafter at time $t_2$, OR gate 134 of controller 130 asserts the HIGH state on control terminal N2 of first switch 110, thereby turning ON 403 the first switch 110. The state change of the control signal to the LOW state is asserted to the input of the delay element 132 at time $t_1$. In response thereto, the delay element waits 405 approximately 2 nanoseconds to time $t_3$, and then changes the state of the delay signal to the LOW state. This LOW state is asserted on control terminal N3 of the second switch 120, thereby turning OFF 407 the second switch at time $t_4$. During the time interval between $t_1$ and $t_4$, both inputs of logic gate 140 thus receive the HIGH state, and consequently, the output OUT of multiplexor 200 supplies the output signal at HIGH state during the entire interval of time between $t_1$ and $t_4$, thereby preventing glitches in the output signal during the switching operation of the improved multiplexor 200.

To switch back to the first digital signal, a similar processes is followed. Particularly, prior to time $t_5$, both inputs A and B are asserted at the same state. At time $t_5$, the control signal changes state to the HIGH state, which turns ON the first switch 110 at time $t_6$. The delay element 132 waits approximately 2 nanosecond from the state change of the control signal, and then changes the state of the delay signal to the HIGH state at time $t_7$. Responsive thereto at time $t_8$, the second switch 120 is turned OFF.

Various modifications to the improved multiplexors 100, 200, 300 are possible, such as using other conditions to control switches 110, 120. In one alternative embodiment of improved multiplexor 100, the first switch is turned ON by asserting a LOW state of 0 volts to control terminal N2, and is turned OFF by asserting a HIGH state of 5 volts to control terminal N2; and the second switch is turned ON by asserting a HIGH state of 3 volts to control terminal N3, and turned OFF by asserting a LOW state of 0 volts to control terminal N3. Alternatively, one or more of the switches 110, 120 may be controlled by asserting appropriate levels to control terminals N2, N3. In another alternative embodiment of improved multiplexor 200, the controller 130 is modified by including an additional delay element.

Various modifications can specifically be made to the controller 130. An additional delay element may included in the controller 130 of FIGS. 2, 3, for example, by coupling the output of delay element be 132 to the second input of OR gate 134, and to the input of the additional delay element, but not to the second input of NAND gate 136, and by coupling the output of the additional delay element to the second input of the NAND gate 136. An additional delay element can also be included in controller 130 in parallel with delay element 132, for example, by coupling the output of delay element 132 to the second input of NAND gate 136 but not to the second input of OR gate 134, coupling the input of the additional delay element to the input of delay element 132, and by coupling the output of the additional delay element to the second input of the OR gate 134. Either of these alternative embodiments of the controller 130 can beneficially provide a different delay duration for the OR gate 134 than for the NAND gate 136, and thus may be beneficially used to delay turning OFF each switch 110, 120 by precisely the interval of time required to allow the other switch 120, 110 to become stably ON.

The improved multiplexors 100, 200, 300 can be fabricated on an integrated circuit (IC) chip, and are highly beneficial for supplying signals within the IC chip to circuitry off the IC chip, and may be used in such capacity in conformance with IEEE Standard 1394. In one embodiment the improved multiplexor forms a portion of an output buffer of an IC chip. In this embodiment, both inputs A, B, and the control terminal S of the improved multiplexor are coupled to a driving block on the IC chip. The driving block supplies input A with a data signal that conforms to IEEE Standard 1394 and that has a signal rate possibly in excess of 200 megahertz. The driving block supplies input B with an arbitration signal that conforms to IEEE Standard 1394 and that typically has a signal rate of about 50 megahertz. The driving block controls the improved multiplexor by supplying the control signal with appropriate states to its control terminal S, and by supplying the data and arbitration signals at substantially equal voltages during switching operations of the improved multiplexor.

The improved multiplexor may also be employed in a similar manner to supply both strobe and arbitration signals in conformance with IEEE Standard 1394 to circuitry off the IC chip. A conventional encoder, such as encoder 20 may be used to generate the strobe signal in conformance with IEEE Standard 1394. However, encoder 20 generates the strobe signal by application of a recursive encoding algorithm that provides an undesired time delay to strobe signal. This time delay requires that the data signal be buffered for at least one clock cycle. There will thus be a latency of at least one clock cycle introduced to both the data signal and the strobe signal because of the time delay. Moreover, encoder 20 does not include means for supplying both the strobe and arbitration signals at substantially the same value during switching operations. An improved encoder that operates in conformance with IEEE Standard 1394 is therefore highly desirably.

Referring now to FIG. 6, there is shown a block diagram of an embodiment of an improved encoder 600 for performing according to a recursive encoding algorithm but substantially without use of recursive logic. The recursive encoding algorithm performed in this manner preferably is selected from a plurality of encoding algorithms specified in IEEE Standard 1394 for encoding a data signal conforming to the standard to generate a strobe signal conforming to the standard.

This embodiment of the improved encoder 600 comprises an initializing unit 610 and an encoding unit 630. The initializing unit 610 includes an input P that is eight bits wide and an output I that is nine bits wide. The initializing unit 610 supplies a one bit wide prefix to a signal received at input P to generate an intermediate signal at output I. The encoding unit 630 includes an input D and an output S both nine bits wide. The encoding unit encodes the intermediate signal in a combinational manner not using recursive logic. The input D of the encoding unit 630 is coupled to output I of the initializing unit 610.

Referring now also to FIG. 7, there is shown a flow chart of an embodiment of an improved method for encoding the bits of a digital signal that is performed by improved encoder 600. The method is initiated by receiving 701 the digital signal in parallel eight bits at a time at input P of the initializing unit 610. The initializing unit 610 supplies a one bit prefix to the digital signal to generate an intermediate signal. The intermediate signal comprises the prefix followed by the digital signal. The intermediate signal is supplied 703 in parallel via output I to input D of the encoding unit 630. The encoding unit 630 encodes the intermediate signal in the substantially combinational manner to generate an encoded signal that includes an encoding of the bits of the digital signal in accordance with the recursive encoding algorithm. This preferably is achieved by encoding the one bit prefix and in parallel encoding the next eight bits of the intermediate signal with combinational logic 705.

Bits of the digital signal after the eighth bit may be encoded in a variety of manners. For example, each successive eight bit wide block of the digital signal may be prefixed in the manner described above to generate an intermediate signal that is encoded as described above. However, the encoded prefix in such successive eight bit wide block would preferably be ignored. Alternatively, initializing unit 610 may be designed to prefix only a first eight bit wide portion of the digital signal, and not prefix any remaining portion of the digital signal.

Referring now to FIGS. 8, 10 there are shown preferred embodiments of the initializing unit 610 and the encoding unit 630 which when serially coupled as shown in FIG. 6 form a preferred embodiment of the improved encoder 600. This preferred embodiment of the encoder 600 is specifically adapted for performing data-strobe encoding in conformance with IEEE Standard 1394. The computational complexity of the encoding process performed by this embodiment of the improved encoder 600 is beneficially reduced relative to the conventional data-strobe encoding process implemented by conventional encoder 20. This allows for parallel encoding of data signals and greatly reduces the time required to encode data signals in conformance with IEEE Standard 1394.

The reduction in computational complexity relative to the conventional encoder 20 is achieved as follows. The conventional encoder 20 specified in IEEE Standard 1394 generates strobe bits according to the following process:

$$s_0 = d_0, \quad \text{(Eq. 1)}$$

$$s_1 = (d_1 \oplus d_0) \oplus /s_0, \quad \text{(Eq. 2)}$$

$$s_2 = (d_2 \oplus d_1) \oplus /s_1, \quad \text{(Eq. 3)}$$

$$s_m = (d_m \oplus d_{m-1}) \oplus /s_{m-1}, \quad \text{(Eq. 4)}$$

In Eqs. 1, 2, 3, 4, each symbol ⊕ signifies operation of an XOR gate. The $s_i$ and $d_i$ symbols in each equation represent the outputs of the D flip-flops 24, 28 for a respective clock cycle. For example, in Eq. 3, the symbols $s_1$ and $d_1$ represent a strobe and data bit that are output in the clock cycle immediately following the clock cycle in which strobe and data bits $s_0$ and $d_0$ are output. Data bit $d_0$ and inverted strobe bit $/s_0$ both constitute feedback in Eq. 2. The encoding process implemented by conventional encoder 20 is recursive and introduces latency into the data and strobe signals.

In improved encoder 600 this additional latency is avoided. To understand how the latency can be avoided, the dependence of each strobe bit $s_i$ for i>1 on its immediate predecessor strobe bit $s_{i-1}$ is rewritten in a modified relationship that expresses the dependence of the strobe bit $s_i$ in terms of predecessor strobe bit $s_{i-2}$. For example, the dependence of strobe bit $s_2$ on strobe bit $s_1$ is rewritten to obtain the modified relationship:

$$s_2 = d_2 \oplus d_1 \oplus /s_1 = d_2 \oplus d_1 \oplus /(d_1 \oplus d_0 \oplus /s_0) = d_2 \oplus d_0 \oplus s_0. \quad \text{(Eq. 5)}$$

For strobe bits si, where i>2, dependence on successively more distant predecessor strobe bits $s_{i-3}, s_{i-4}, \ldots, s_0$ is obtained to yield modified relationships:

$$s_0 = d_0, \quad \text{(Eq. 6)}$$

$$s_1 = d_1 \oplus i\, d_0 \oplus /s_0, \quad \text{(Eq. 7)}$$

$$s_2 = d_2 \oplus d_0 \oplus /s_0, \quad \text{(Eq. 5)}$$

$$s_3 = d_3 \oplus d_0 \oplus /s_0, \quad \text{((Eq. 8)}$$

$$s_{2i} = d_{2i} \oplus d_0 \oplus /s_0, \text{ and} \quad \text{(Eq. 9)}$$

$$s_{2i+1} = d_{2i+1} \oplus d_0 \oplus /s_0. \quad \text{(Eq. 10)}$$

To reduce computational complexity of these relationships in Eq. 6, 7, 8, 9, 10, an additional data bit $d_{-1}$ and an additional strobe bit $s_{-1}$ are provided. The additional strobe bit $s_{-1}$ is dependent on the additional data bit $d_{-1}$, and may be expressed as $s_{-1} = /d_{-1}$. To conform to IEEE Standard 1394 the additional strobe bit $s_{-1}$ is set equal to binary value ZERO and the additional data bit $d_{-1}$ is set equal to binary value ONE.

The additional data bit $d_{-1}$ and additional strobe bit $s_{-1}$ are subjected to the encoding process of conventional encoder 20 to determined values for data bit $d_0$ and strobe bit $s_0$. This may be expressed by the relationship $s_0 = d_0 \oplus d_{-1} \oplus /s_{-1}$. The value of the second portion $(d_{-1} \oplus /s_{-1})$ of this relationship is $(d_{-1} \oplus /s_{-1}) = 1 \oplus /0 = 1 \oplus 1 = 0$. Thus, $s_0 = d_0 \oplus (d_{-1} \oplus /s_{-1}) = d_0 \oplus 0 = d_0$. From this equality it can be seen that $d_0 \oplus s_0 = 0$ and $d_0 \oplus /s_0 = 1$. By substituting these relationships into Eqs. 5, 7, 8, 9, 10, the IEEE Standard 1394 coding process can be expressed as:

$$d_{-1} = 1 \quad \text{(Eq. 11)}$$

$$s_{-1} = 0 \quad \text{(Eq. 12)}$$

$$s_0 = d_0, \quad \text{(Eq. 13)}$$

$$s_1 = /d_1, \quad \text{(Eq. 14)}$$

$$s_2 = d_2, \quad \text{(Eq. 15)}$$

$$\ldots$$

$$s_{2i} = d_{2i}, \text{ and} \quad \text{(Eq. 16)}$$

$$s_{2i+1} = /d_{2i+1}. \quad \text{(Eq. 17)}$$

The strobe coding process expressed by Eqs. 11, 12, 13, 14, 15, 16, 17 can be performed in a memoryless manner as each strobe bit $s_j$ is represented entirely in terms of a current data bit $d_j$. This process can now be performed without recursion because each strobe bit $s_j$ is represented without dependence on any prior strobe bits $s_k$ (i.e. where k<j). The structure and operation of the initializing unit 610 and encoding unit 630 of this preferred embodiment of the improved encoder 600 are next described with reference to FIGS. 8, 9, 10, 11.

Referring now to FIG. 8, there is shown a block diagram of a preferred embodiment of the initializing unit 610 suitable for inclusion in improved encoder 600. This embodiment of the initializing unit 610 is designed to receive the digital signal as a data packet comprising a sequence of bits that conforms to IEEE Standard 1394 requirements for data packets. This embodiment of the initializing unit 610 includes a prefix generator 612 and a shift register 614. The prefix generator 612 has an eight bit wide input for receiving eight bit wide blocks of the data packet in parallel, and has a one bit wide output for supplying the prefix to the digital signal. The shift register 614 has a nine bit wide input ($SR_{-1}, SR_0, SR_1, \ldots SR_7$) and a nine bit wide output ($I_{-1}, I_0, I_1, \ldots I_7$). Input $SR_{-1}$ of the shift register 614 is coupled to receive the prefix from the output of the prefix generator 612. Inputs $SR_0, SR_1, \ldots SR_7$ of the shift register 614 are coupled to receive eight bit wide blocks of data packet in parallel. The output $I_{-1}, I_0, I_1, \ldots I_7$ of the shift register 614 supplies the intermediate signal in parallel.

Referring now also to FIG. 9, there is shown a flow chart illustrating a method of operating the initializing unit 610 illustrated in FIG. 8. Operation begins by receiving 901 the first eight bits ($d_0, d_1, \ldots d_7$) of the data packet in parallel at the input of the prefix generator 612 and also at the input $SR_0, SR_1, \ldots SR_7$ of the shift register 614. The prefix generator 612 then generates 903 a prefix for the data packet that allows the encoding of the bits of the data packet substantially without use of recursion. For example, the prefix may comprise a single bit of binary value ONE to implement data strobe encoding in conformance with IEEE Standard 1394. The prefix generator 612 supplies 905 the prefix to the first bit of the shift register 614, thereby placing the prefix at the beginning the data packet. The output I of the shift register 614 then supplies the intermediate signal as a sequence of bits ($i_{-1}, i_0, i_1, i_2, \ldots, i_m$) with bit $i_{-1}$ being equal to the prefix of binary value ONE, m being an integer, and bits $i_0, i_1, i_2, \ldots i_7$ being equal respectively to the first eight bits $d_0, d_1, \ldots d_7$ of the data packet. After the first eight bits $d_0, d_1, \ldots d_7$ of the data packet are processed in this manner, remaining bits $d_8 \ldots d_m$ where m>7 of the data packet are processed in eight bit wide blocks $d_{0+8\times n}, d_{1+8\times n}, \ldots d_{7+8\times n}$ (n being an integer) with their processed values $i_{0+8\times n}, i_{1+8\times n}, \ldots i_{7+8\times n}$ supplied from bits $I_0, I_1, \ldots I_7$ of output I of the initializing unit 610.

Referring now to FIG. 10, there is shown a schematic diagram of an embodiment of the encoding unit 630 suitable for inclusion in improved encoder 600. This embodiment of the encoding unit 630 includes a prefix encoder 639 and a combinational logic block 641. The prefix encoder 639 comprises an inverter having an input $D_{-1}$ and an output $S_{-1}$. The prefix encoder 639 encodes bit $i_{-1}$ of the intermediate signal. The combinational logic block 641 comprises eight signal paths 631, 632, 633, 634, 635, 636, 637, 638, a portion of which 632, 634, 636, 638 include a respective inverter. Each signal path has an input ($D_j$) and an output ($S_j$), where index j is a corresponding integer from the set $\{0, 1, 2, 3, 4, 5, 6, 7\}$. The signal paths are configured in parallel. Each signal path encodes a corresponding bit (modulo 8) of the intermediate signal. For example, signal path 631 encodes bits $i_0, i_8, \ldots, i_{1+8\times n}$ of the intermediate signal, and similarly, signal path 636 encodes bits $i_5, i_{13}, \ldots i_{5+8\times n}$ of the intermediate signal. More particularly, the signal paths that include an inverter 632, 634, 636, 638 are arranged in a staggered configuration with the other signal paths 631, 633, 635, 637. Due to the staggered configuration, the signal paths 632, 634, 636, 638 that include an inverter encode the bits $i_{2m+1}$ having odd index 2 m+1 by inverting them, whereas the signal paths 631, 633, 635, 637 that do not include an inverter encode but do not invert the bits $i_{2m}$ having even index 2 m.

Referring now also to FIG. 11, there is shown is a flow chart illustrating a method of operating the encoding unit 630 illustrated in FIG. 10. Operation begins by receiving 1101 the first nine bits $i_{-1}, i_0, i_1, \ldots, i_7$ of the intermediate signal in parallel respectively at inputs $D_{-1}, D_0, D_1, \ldots, D_7$. These bits $i_{-1}, i_0, i_1, \ldots, i_7$ are encoded 1103 by alternately inverting and not inverting bits. That is, bit $i_{-1}$ is inverted to generate a first bit ($s_{-1}$) of an encoded signal (s) according to $s_{-1}=/i_{-1}$. Bit $i_0$ is not inverted to generate a second bit ($s_0$) of the encoded signal s according to $s_0=i_0$. Bit $i_1$ is inverted to generate a third bit ($s_1$) of the encoded signal s according to $s_1=/i_1$, etc. These encoding operations are performed in parallel, and the first nine bits $s_{-1}=/i_{-1}, s_0=i_0, s_1=/i_1, s_2=i_2, s_3=/i_3, s_4=i_4, s_5=/i_5, s_6=i_6,$ and $s_7=/i_7$ of the encoded signal s are output 1105 respectively at outputs $s_{-1}, s_0, \ldots s_7$ respectively of the encoding unit 630.

Remaining bits $i_m$ of the intermediate signal (i.e. m>7) are encoded eight bit blocks, with input $D_{-1}$ and output $S_{-1}$ not being used for such blocks. Thus, $s_{0+8\times n}=i_{0+8\times n}, s_{1+8\times n}=/i_{1+8\times n}, s_{2+8\times n}=i_{2+8\times n}, s_{3+8\times n}=/i_{3+8\times n}, s_{4+8\times n}=i_{4+8\times n}, s_{5+8\times n}=/i_{5+8\times n}, s_{6+8\times n}=i_{6+8\times n},$ and $s_{7+8\times n}=/i_{7+8\times n}$ for integers $n \geq 0$. It is noted that data-strobe encoding conforming to IEEE Standard 1394 requires that the prefix $d_{-1}$ have binary value ONE and that the first bit of the strobe signal $s_{-1}$ have binary value ZERO. Accordingly, for such data-strobe encoding, the encoding unit 630 concatenates a single bit $d_{-1}$ of binary value ONE after an output signal supplied by the combinational logic block 641 to generate a strobe signal s conforming to IEEE Standard 1394.

It is noted that the combinational logic block 641 supplies a memoryless encoding of the portion of the intermediate signal that follows the first bit $i_{-1}$. This embodiment of the encoding unit 630 supplies a memoryless encoding $s_0=i_0, s_1=/i_1, s_2=i_2, s_3=/i_3, s_4, i_4, s_5=/i_5, s_6=i_6, s_7=/i_7 \ldots s_{2m}=i_{2m}, s_{2m+1}=/i_{2m+1}$ of that portion $i_0, i_1, i_2, i_3, i_4, i_5, i_6, i_7 \ldots i_{2m}, i_{2m+1}$ of the intermediate signal that follows the first bit $i_{-1}$. It is further noted that this embodiment of the encoding unit 630 supplies a memoryless encoding $s_{-1}=/i_{-1}, s_0=i_0, s_1=/i_1, s_2=i_2, s_3=/i_3, s_4=i_4, s_5=/i_5, s_6=i_6, s_7=/i_7 \ldots s_{2m}=i_{2m}, s_{2m+1}=/i_{2m+1}$ of the entire intermediate signal $i_{-1}, i_0, i_1, i_2, i_3, i_4, i_5, i_6, i_7 \ldots i_{2m}, i_{2m+1}$ which is equivalent to the non-memoryless and recursive encoding supplied by the conventional recursive encoder (i.e. having two XOR gates and two D flip-flops) described in IEEE Standard 1394 for data-strobe encoding. Moreover, both the prefix encoder 639 and the combinational logic block 641 (and the encoding unit 630 as a whole) operate in a one-to-one manner. Each bit $i_m$ of the interrnediate signal is encoded separately to yield a corresponding single bit $s_m$ of the encoded signal.

Referring now to FIG. 12, there is shown a schematic diagram of an alternative embodiment of the encoding unit 630 that encodes the intermediate signal in parallel and supplies the encoded signal in serial as a strobe signal in accordance with IEEE Standard 1394. This embodiment of the encoding unit 630 includes a prefix encoder 639 and combinational logic block 641 modified from those shown in FIG. 10 in the manner described below, and also includes a plurality of multiplexors 642, 644, 646, 648, 652, 654, 656 and a shift register 660.

In this embodiment of the encoding unit 630, the prefix encoder 639 comprises a tri-state inverter formed by coupling the output of an inverter 671 to the input of a transmission gate 672. The output of the transmission gate 672 serves as the output of the prefix encoder 639. Control terminals $CD_{-1}/CD_{-1}$ of the transmission gate 672 are coupled in series by a second inverter 673 allowing the transmission gate 672 to be turned ON (OFF) by asserting the HIGH state (LOW state) to control terminal $CD_{-1}$. When control terminal $CD_{-1}$ is asserted at HIGH state, the prefix encoder 639 inverts a bit received at input $D_{-1}$ and supplies the inverted bit at the output of the transmission gate 672. By asserting control terminal $CD_{-1}$ at LOW state, transmission gate 672 is turned OFF, which floats the output of the transmission gate 672, thus providing a tri-state mode for the prefix encoder 639.

The combinational logic block 641 in this embodiment of the encoding unit 630 has the same design as in FIG. 10. A plurality of conductive lines $BD_0, BD_1, BD_2, BD_3, BD_4, BD_5, BD_6, BD_7$ included in this embodiment of the encoding unit 630 are drawn over the combinational logic block 641 for clarity of illustration. Finally, the shift register 660 has an eight bit parallel input, a single bit input, a clock terminal (G_CLK), a control terminal ($CT_{-1}$), and a serial output (Strobe_Out). Asserting control terminal $CT_{-1}$ at LOW state allows signals to be received via the eight bit parallel input of the shift register 660, whereas asserting control terminal $CT_{-1}$ at HIGH state allows signals to be received via the single bit input of the shift register 660.

The output of the combinational logic block 641 is coupled in parallel to first inputs (0) of the multiplexors 642, 644, 646, 648, 652, 654, 656. The conductive lines $BD_0$, $BD_1$, $BD_2$, $BD_3$, $BD_4$, $BD_5$, $BD_6$, $BD_7$ are coupled to second inputs (1) of the multiplexors 642, 644, 646, 648, 652, 654, 656. The control terminals of the multiplexors 642, 644, 646, 648, 652, 654, 656 are coupled to form a common control terminal (BYPASS) that switches connection of the first inputs (0) and second inputs (1) to the outputs of multiplexors 642, 644, 646, 648, 652, 654, 656. The outputs of the multiplexors 642, 644, 646, 648, 652, 654, 656 are coupled in parallel to the eight bit parallel input of the shift register 660. The output of the prefix encoder 639 is coupled to the single bit input of the shift register 660.

Referring now also to FIG. 13, there is shown a flow chart of an alternative embodiment of the improved method of encoding digital signals performed by the embodiment of the encoding unit 630 illustrated in FIG. 12. The method may be initiated by receiving 1301 a bypass signal at the control terminal BYPASS of the multiplexors 642, 644, 646, 648, 652, 654, 656. If the bypass signal is asserted 1303 at LOW state, then an encoding mode of the encoding unit 630 is activated. To encode the first bit $i_{-1}$ of the intermediate signal, control terminal $CT_{-1}$ of shift register 660 is asserted at HIGH state. This activates the single bit input of shift register 660 and deactivates the parallel input of the shift register 660. The first bit $i_{-1}$ of the intermediate signal is received at the input of the prefix encoder 639, encoded by inverter 671, and then supplied to the input of transmission gate 672. The control terminal $CD_{-1}$ of the prefix encoder 639 is asserted at HIGH state, thereby turning ON the transmission gate 672 and supplying the encoded bit $/i_{-1}$ to the shift register 660. Control terminal $CD_{-1}$ is then asserted at LOW state to turn OFF the transmission gate 672, and the shift register 660 is clocked G_CLK a sufficient number of times to advance the encoded bit $/i_{-1}$ through the serial output Strobe_Out as the first bit of the strobe signal.

Control terminal $CT_{-1}$ of the shift register 660 is then asserted at LOW state, and the next eight bits $i_0, i_1, i_2, i_3, i_4, i_5, i_6, i_7$ of the intermediate signal are received 1305 in parallel at the parallel inputs (0) of multiplexors 642, 644, 646, 648, 652, 654, 656, encoded 1307 in the combinational logic block 641 by alternately inverting and not inverting bits $i_0, i_1, i_2, i_3, i_4 m\ i_5, i_6, i_7$ to generate a next eight bits $s_0=i_0, s_1=/i_1, s_2=i_2, s_3=/i_3, s_4=i_4, s_5=/i_5, s_6=i_6, s_7=/i_7$ of the strobe signal, and these generated bits $s_0, s_1, s_2, s_3, s_4, s_5, s_6, s_7$ are supplied in parallel to the shift register 660. The shift register 660 is then clocked eight times to advance these bits $s_0, s_1, s_2, s_3, s_4, s_5, s_6, s_7$ in series through the output Strobe_Out. Successive eight bit blocks of the intermediate signal are in like manner received 1305 at parallel inputs(0), encoded 1307, and then advanced in series by shift register 660 through output Strobe_Out 1309 as successive eight bit blocks of the strobe signal.

If the bypass signal is asserted at HIGH state 1303, a BYPASS mode of the encoding unit 630 is activated. The BYPASS mode allows a bypass signal that may represent, for example, an initial state of an arbitration signal to be received by the encoding unit 630. When BYPASS mode is activated, the bypass signal is received via parallel via conductive lines $BD_0$, $BD_1$, $BD_2$, $BD_3$, $BD_4$, $BD_5$, $BD_6$, $BD_7$ at inputs(1) of the multiplexors 642, 644, 646, 648, 652, 654, 656, supplied therefrom in parallel to the shift register 660, and then serially from the output Strobe_Out. Thus, in this embodiment of the encoding unit 630, if the bypass signal matches the initial state or initial states of arbitration signal, then so will the signal output from Strobe_Out during BYPASS mode.

This embodiment of the encoding unit 630 is highly beneficial for driving the improved multiplexors 100, 200, 300. For example, during switching operations, an arbitration signal may be supplied to one input of improved multiplexor 200 and the matching output signal from output Strobe_Out supplied to the other input of improved multiplexor 200. This prevents glitches from arising at the output of the improved multiplexor 200, as described more fully above with respect to FIG. 5.

Referring now to FIG. 14, there is shown a block diagram of an alternative embodiment of the improved encoder 1400. Improved encoder 1400 comprises a timing generator 1410, a D flip-flop 1411, a shift register 1413, a prefix and end bit unit 1415, a gated clock 1416, multiplexors 1417, 201, 202, and an encoding unit 630. FIG. 14 also shows a driving block 1419 that supplies signals to the improved encoder 1400. These signals include data and arbitration signals conforming to IEEE Standard 1394, with the improved encoder 1400 encoding the data signal to generate a strobe signal conforming to IEEE Standard 1394 and supplying the data, strobe, and arbitration signals to other circuitry (not shown). Preferably, the improved encoder 1400 is fabricated on an IC chip and supplies such signals to circuitry off the IC chip in conformance with IEEE Standard 1394.

The encoding unit 630 has substantially the same structure shown in FIG. 12 except that the shift register 660 further includes a serial input (SI) and the prefix encoder 639 can be omitted. The timing generator 1410 has inputs $C_1, C_2, C_3$, a clock terminal, and a plurality of outputs. The shift register 1413 has a serial input, an eight bit wide parallel input (P), a clock terminal, and a serial output (Data_Out). The prefix and end bit unit 1415 supplies prefixes ($d_{-1}, s_{-1}$) respectively for the data signal and the strobe signal, and supplies other matching bits described below. The gated clock 1416 generates a gated clock signal on line G_CLK. The gated clock 1416 can be activated to supply the gated clock signal at a frequency of about 50 MHz, and deactivated to assert a LOW state on line G_CLK. Multiplexor 1417 is a conventional three-input one-output multiplexor, with the inputs and the output being eight bits wide, and includes a control terminal for selecting which input is connected to the output. Multiplexors 201, 202 each have the same design as multiplexor 200 shown in FIG. 2B. The driving block 1419 supplies the data and arbitration signals to the improved encoder 1400. The driving block 1419 also supplies various control signals to the improved encoder 1400, such as a clock signal on clock line CLK.

The driving block 1419 is connected to the inputs of the multiplexor 1417, to the second inputs(1) of multiplexors 201, 202, to the inputs $C_1, C_2, C_3$ of the timing generator 1410, to a reset terminal of the D flip-flop 1411, and via clock line CLK to clock terminals of both the timing generator 1410 and the D flip-flop 1411. The timing generator 1410 is connected to the prefix and end bit unit 1415, the gated clock 1416, the control terminal of multiplexor 1417, and to the D input of the D flip-flop 1411. The prefix and end bit unit 1415 is connected to the serial input of shift register 1413, to the serial input SI of shift register 660 of the encoding unit 630, to inputs $D_0, D_1, D_2, D_3, D_4, D_5, D_6, D_7$ (collectively referenced $D_{0-7}$) of the encoding unit 630, and to conductive lines $BD_0, BD_1, BD_2, BD_3, BD_4, BD_5, BD_6, BD_7$ (collectively referenced as $BD_{0-7}$) of encoding unit 630. The gated clock 1416 is connected via a gated clock line G_CLK to the clock terminal of shift register 1413, and to the clock terminal of shift register 660 of the encoding unit 630. The output of multiplexor 1417 is connected to the parallel input P of shift register 1413, and to inputs $D_{0-7}$ of the encoding unit 630. The serial output Data_Out of shift register 1413 is connected to the input (0) of multiplexor 202, and the serial output Strobe_Out of shift register 660 of encoding unit 630 is connected to the first input(0) of multiplexor 201.

Operation may begin, for example, in an arbitration mode wherein an arbitration signal is supplied at outputs Out_SA, Out_DA respectively of multiplexors 201, 202. To proceed to a data mode wherein data and strobe signals are supplied at outputs Out_SA, Out_DA the following acts are performed. The driving unit 1419 selects one of three data signals supplied to multiplexor 1417, and sends a selection signal that designates the selected data signal to input $C_1$ of the timing generator 1410. The timing generator 1410 in turn sends a second selection signal to the control terminal of multiplexor 1417 to connect the selected data signal through to the output of the multiplexor 1417. The driving unit 1419 also supplies a mode signal designating the data mode to input $C_3$ to instruct the timing generator 1410 to change from arbitration mode to data mode. Responsive to the mode signal and the clock signal, the timing generator 1410 instructs the prefix and end bit unit 1415 to supply bits matching an end portion of the arbitration signal (matching bits) to conductive lines $BD_{0-7}$ of encoding unit 630. The end portion of the arbitration signal is also supplied in serial by the driving block 1419 to inputs(1) of multiplexors 201, 202, and in parallel via multiplexor 1417 to the parallel input P of shift register 1413. The driving unit 1419 further sends a control signal to input $C_2$ of the timing generator 1410 that instructs the timing generator 1410 to activate the gated clock 1416.

Once activated, the gated clock 1416 clocks shift register 1413 and shift register 660, thereby supplying the matching bits via the serial outputs Data_Out, Strobe_out of shift registers 1413, 660 to inputs(0) of multiplexors 202, 201. The timing generator 1410 also asserts a LOW state to the input D of D flip-flop 1411, and upon a next rising edge of the clock signal, the D flip-flop 1411 asserts the received LOW state to the control terminals of multiplexors 201, 202, which connects inputs(0) of these multiplexors 201, 202 to their respective outputs Out_SA, Out_DA. Glitches are prevented from arising at these outputs Out_SA, Out_DA because the matching bits match the end portion of the arbitration signal.

The timing generator 1410 also instructs the prefix and end bit unit 1415 to supply the first bit of the strobe signal s to the serial input SI of the shift register 660 of encoding unit 630, and to supply the first bit $d_{-1}$ of a data packet portion of the data signal to the serial input of shift register 1413. Responsive to clocking by the gated clock signal on line G_CLK, bit $s_{-1}$ is supplied by the output Strobe_Out of shift register 660 to the input(0) of multiplexor 201, and bit $d_{-1}$ is supplied by the output Data_Out of shift register 1413 to the input(0) of multiplexor 202. The timing generator 1410 further instructs the prefix and end bit unit 1415 to assert the bypass signal at LOW state. This causes the inputs $D_{0-7}$ of the encoding unit 630 to receive the data signal. The encoding unit 630 encodes the received data signal without recursion to generate a second portion of the strobe signal $s_0, s_1, \ldots, s_m$ which is supplied serially from the output Strobe_Out of shift register 660 to input(0) of multiplexor 201 after the first bit of the strobe signal $s_{-1}$. The gated clock signal advances the strobe signal serially through shift register 1413. The gated clock signal also advances the data signal through shift register 1413.

The improved encoder 1400 may be switched back to the arbitration mode in similar manner. When switching back to the arbitration mode, the arbitration signal is supplied to shift register 1413 via multiplexor 1417, to encoding unit 630 via the prefix and end bit unit 1415, and to inputs (1) of multiplexors 201, 202, and the matching bits match an initial portion of the arbitration signal. States of various signals, such as those supplied to control terminals of multiplexors 201, 202, may be inverted.

What is claimed is:

1. A method for encoding bits of a digital signal in accordance with a recursive encoding algorithm, the method comprising:

receiving the digital signal;

supplying a prefix to the digital signal to generate an intermediate signal; and encoding the intermediate signal combinationally to generate an encoded signal that includes an encoding of the bits of the digital signal in accordance with the recursive encoding algorithm.

2. The method of claim 1, wherein the recursive encoding algorithm conforms to IEEE Standard 1394 data-strobe encoding.

3. The method of claim 1, further comprising the act of selecting the recursive encoding algorithm from a plurality of encoding algorithms specified in IEEE Standard 1394 for generating a strobe signal.

4. The method of claim 1, wherein the prefix is a bit, and wherein encoding the intermediate signal combinationally comprises encoding the prefix followed by encoding the digital signal.

5. The method of claim 1, wherein:

receiving the digital signal comprises receiving a data packet that includes a sequence of bits that conforms with IEEE Standard 1394 requirements for data packets;

supplying a prefix to the digital signal to generate an intermediate signal comprises placing a single bit of binary value ONE in front of a beginning of the data packet to generate a prefixed data packet; and encoding the intermediate signal combinationally comprises:

supplying a single bit of binary value ONE;

supplying the digital signal to an input of a combinational logic block;

receiving an output signal responsive to the digital signal from an output of the combinational logic block;

concatenating the output signal after the single bit of binary value ONE to generate the encoded signal as a strobe signal conforming to IEEE Standard 1394.

6. The method of claim 5, wherein the encoding of the digital signal in accordance with the recursive encoding algorithm is the output signal of the combinational logic block.

7. An encoder for encoding a digital signal in accordance with a non-memoryless encoding algorithm to supply an encoded signal, said encoder comprising:

a first means for supplying a prefix to the digital signal;

a second means for encoding the prefix of to supply a first portion of the encoded signal; and a third means for applying a memoryless encoding algorithm to a second portion of the digital signal to supply a second portion of the encoded signal.

8. The encoder of claim 7, further comprising a combinational logic block having an input for receiving a bit of the digital signal, and having an output for supplying a bit of the encoded signal.

9. The encoder of claim 7, wherein the second means encodes each bit of the first portion of the digital signal in a one-to-one manner to supply a corresponding bit of the first portion of the encoded signal.

10. The encoder of claim 7, wherein the third means encodes each bit of the second portion of the digital signal in a one-to-one manner to supply a corresponding bit of the second portion of the encoded signal.

11. The encoder of claim 7, wherein the second means encodes each bit of the first portion of the digital signal in a one-to-one manner to supply a corresponding bit of the first portion of the encoded signal, and wherein the third means encodes each bit of the second portion of the digital signal in a one-to-one manner to supply a corresponding bit of the second portion of the encoded signal.

12. An encoder for encoding bits of a digital signal in accordance with a recursive encoding algorithm, the encoder comprising:

an initializing unit for supplying a prefix to the digital signal to generate an intermediate signal; and a combinational logic block having an input coupled to receive the intermediate signal, and having an output for supplying an encoded signal that includes an encoding of the bits of the digital signal in conformance with the recursive encoding algorithm.

13. The encoder of claim 12, wherein the combinational logic block comprises a plurality of parallel signal paths, each signal path having an input for receiving a respective bit of the intermediate signal and having an output for supplying a respective bit of the encoded signal.

14. The encoder of claim 13, wherein some of the signal paths comprise an inverter.

15. The encoder of claim 13, wherein at least half of the signal paths comprise an inverter.

16. The encoder of claim 13, wherein exactly half of the signal paths comprise an inverter.

17. The encoder of claim 12, wherein the combinational logic block comprises:

a first plurality of signal paths, each having an input for receiving a respective bit of the intermediate signal and having an output for supplying the bit received as a respective bit of the encoded signal; and a second plurality of signal paths, each having an input for receiving a respective bit of the intermediate signal and having an output for supplying an inverse of the bit received as a respective bit of the encoded signal.

18. The encoder of claim 17, wherein the first plurality of signal paths are arranged in staggered configuration with the second plurality of signal paths.

19. The encoder of claim 17, wherein the intermediate signal comprises a plurality of bits arranged in a sequential order, said sequential order represented by a continuous subset of integers, and wherein the first plurality of signal paths encodes each bit having sequential order represented by an even integer.

20. The encoder of claim 12, further comprising a switching circuit having an output switchably coupled both to a first input that receives the encoded signal and to a second input that receives a second signal.

21. The encoder of claim 12, further comprising:

a controller having respective inputs coupled to receive the encoded signal, an arbitration signal, and a control signal, and having an output for supplying a fourth signal that responds to the encoded signal while the control signal is in a first state and that represents the arbitration signal while the control signal makes transition from the first state to a second state; and a multiplexor having a first input coupled to receive the arbitration signal, a second input coupled to receive the fourth signal, a control terminal coupled to receive the control signal, and an output for supplying an output signal that represents the arbitration signal and the fourth signal during transitions of the control signal.

22. The encoder of claim 21, wherein the fourth signal is substantially identical to the encoded signal while the control signal is in the first state.

23. The encoder of claim 21, wherein the fourth signal is substantially identical to the encoded signal while the control signal makes transitions from the second state to the first state.

24. An encoding circuit generating a second data stream, $s_0, s_1, s_2, \ldots s_m$, from a first data stream, $p_0, p_1, p_2, \ldots p_m$, in accordance with a recursive function defined as: $s_0=d_0$, $s_1=(d_i \text{ XOR } d_0) \text{ XOR}_{NOT\_}s_0$, $s_2=(d_2 \text{ XOR } d_1) \text{ XOR}_{NOT\_}s_1, \ldots s_m=(d_m \text{ XOR } d_{m-1}) \text{ XOR}_{NOT\_}s_{m-1}$, said second data stream having a bit-by-bit correspondence with said first data stream, said encoding circuit comprising:

a prefix generator for concatenating at least one prefix data bit, into said first data stream;

an inverting circuit receiving said concatenated first data stream and logically inverting alternate bits in said concatenated first data stream, each logically inverted data bit being a corresponding data bit in said second data stream and each non-inverted data bit in said concatenated first data stream being a corresponding data bit in said second data stream.

25. The encoding circuit of claim 24, wherein said inverting circuit logically inverts alternate bits in said concatenated first data stream beginning with said prefix data bit.

26. The encoding circuit of claim 24, wherein said prefix data bit has a predefined logic value.

27. The encoding circuit of claim 26, wherein said prefix data bit is a logic 1.

28. The encoding circuit of claim 24, wherein said first data stream is received as a serial input.

29. The encoding circuit of claim 24, wherein said first data stream is received in parallel data blocks.

30. The encoding circuit of claim 24, wherein said second data stream is output as a serial output.

31. The encoding circuit of claim 24, wherein said second data stream is output in parallel data blocks.

32. The encoding circuit of claim 24, further having a bank of input nodes for receiving said first data stream in parallel data blocks, a bank of output nodes for outputting said second data stream in parallel data blocks, said input nodes being coupled to corresponding output nodes along corresponding data paths through said inverting circuit such that alternate data paths have an inverter coupling their corresponding input node to their corresponding output node.

33. The encoding circuit of claim 32, wherein said bank of output nodes is greater than said bank of input nodes.

34. The encoding circuit of claim 33, wherein there is one more output node than there are input nodes.

35. The encoding circuit of claim 33, further having a parallel-in/serial-out shift register, said bank of output nodes being coupled to the parallel-in inputs of said shift register, said shift registers serially placing said second data stream on its serial-out output node.

36. The encoding circuit of claim 35, wherein said bank of output nodes are divided into a first segment of output nodes having a one-to-one correspondence with said bank of input nodes and into a second segment of output nodes having a one-to-one correspondence with the number of prefix data bits concatenated by said prefix generator into said first data stream, said shift register being effective for latching in said second segment of output nodes during its initial latch-in/shift-out cycle and not latching in said second segment of output nodes during subsequent latch-in/shift-out cycles.

37. The encoding circuit of claim of claim 32, further having a second bank of input nodes for receiving alternate data, and a multiplexer for selectively coupling one of said bank of output nodes and second bank of input nodes to said shift register, said encoding circuit not implanting said recursive function when said alternate data is selected by said multiplexer.

38. The encoding circuit of claim 24, wherein said second data stream is a stream of strobe bits in accordance with IEEE Standard 1394 data-strobe encoding.

39. A method of generating a second data stream, $s_0, s_1, s_2, \ldots s_m$, from a first data stream, $p_0, p_1, p_2, \ldots p_m$, in accordance with a recursive function defined as: $s_0=d_0$, $s_1=(d_1 \text{ XOR } d_0) \text{ XOR}_{NOT\_} s_0$, $s_2=(d_2 \text{ XOR } d_1) \text{ XOR}_{NOT\_} s_1, \ldots s_m=(d_m \text{ XOR } d_{m-1}) \text{ XOR}_{NOT\_} s_{m-1}$, said second data stream having a bit-by-bit correspondence with said first data stream, said method comprising:

concatenating at least one prefix data bit into said first data stream;

logically inverting alternate bits in said concatenated first data stream, each logically inverted data bit being a corresponding data bit in said second data stream and each non-inverted data bit in said concatenated first data stream being a corresponding data bit in said second data stream.

40. The method of claim 39, wherein said logical inverting of alternate bits in said concatenated first data stream begins with said prefix data bit.

41. The method of claim 39, wherein said prefix data bit has a predefined logic value.

42. The method of claim 41, wherein said prefix data bit is a logic 1.

43. The method of claim 39, wherein said first data stream is received serially for generating a second data stream.

44. The method of claim 39, wherein said first data stream is received in parallel data blocks for generating a second data stream.

45. The method of claim 39, wherein said second data stream is generated as a serial output.

46. The method of claim 39, wherein said second data stream is generated as parallel data blocks.

47. The method of claim 39, further including receiving said first data stream in first parallel data blocks, and outputting said second data stream in second parallel data blocks;

alternate bits in said first parallel data blocks being inverted before being grouped with the non-inverted bits of said first parallel data block to produce said second parallel data block.

48. The method of claim 47, wherein said second parallel data blocks are bigger than said first parallel data blocks.

49. The method of claim 48, wherein there is one more data bit in said second parallel data blocks than there are in said first parallel data blocks.

50. The method of claim 48, further including working on said first parallel data blocks in parallel to produce said second data stream, and outputting said second parallel data blocks serially.

51. The method of claim 39, wherein said second data stream is a stream of strobe bits in accordance with IEEE Standard 1394 data-strobe encoding.

52. A method of producing a second data stream, $s_0, s_1, s_2, \ldots s_m$, from a first data stream, $p_0, p_1, p_2, \ldots p_m$, in accordance with a recursive function defined as: $s_0=d_0$, $s_1=(d_1 \text{ XOR } d_0) \text{ XOR}_{NOT\_} s_0$, $s_2=(d_2 \text{ XOR } d_1) \text{ XOR}_{NOT\_} s_1, \ldots s_m=(d_m \text{ XOR } d_{m-1}) \text{ XOR}_{NOT\_} s_{m-1}$, said second data stream having a bit-by-bit correspondence with said first data stream, said method comprising:

setting a first reference quantity equal to $d_0 \text{ XOR } s_0$;

setting a second reference quantity equal to $d_0 \text{ XOR}_{NOT\_} s_0$;

setting $s_0$ to $d_0$;

setting subsequent data bits beginning with Si in said second data stream equal to its corresponding bit in said first data stream XORed with one of said first and second reference quantities, said first and second reference quantities being alternated such that the same reference quantity is not used in the determination of consecutive data bits in said second data stream.

53. The method of claim 52, wherein said second reference quantity is used in the determination of si.

* * * * *

UNITED STATES PATENT AND TRADEMARK OFFICE
CERTIFICATE OF CORRECTION

PATENT NO. : 6,252,526 B1
DATED : June 26, 2001
INVENTOR(S) : Clinton Uyehara

It is certified that error appears in the above-identified patent and that said Letters Patent is hereby corrected as shown below:

Column 22,
Line 27, change "$d_i$" to -- $d_l$ --.

Column 24,
Lined 39 and 47, change "$si$" to -- $s_l$ --.

Signed and Sealed this

Twenty-sixth Day of February, 2002

Attest:

JAMES E. ROGAN
Attesting Officer    Director of the United States Patent and Trademark Office